(12) United States Patent
Klosterman et al.

(10) Patent No.: US 12,052,253 B2
(45) Date of Patent: Jul. 30, 2024

(54) CONTEXT TRACKING ACROSS A DATA MANAGEMENT PLATFORM

(71) Applicant: NetApp, Inc., Sunnyvale, CA (US)

(72) Inventors: Andrew Joseph Klosterman, Cary, NC (US); Richard Nesbitt, Holly Springs, NC (US)

(73) Assignee: NETAPP, INC., San Jose, CA (US)

( * ) Notice: Subject to any disclaimer, the term of this patent is extended or adjusted under 35 U.S.C. 154(b) by 493 days.

(21) Appl. No.: 17/218,758

(22) Filed: Mar. 31, 2021

(65) Prior Publication Data
US 2022/0321567 A1    Oct. 6, 2022

(51) Int. Cl.
*H04L 9/40*    (2022.01)
(52) U.S. Cl.
CPC ................... *H04L 63/102* (2013.01)
(58) Field of Classification Search
CPC ....................................................... H04L 63/102
See application file for complete search history.

(56) References Cited

U.S. PATENT DOCUMENTS

| | | | | |
|---|---|---|---|---|
| 6,012,094 | A * | 1/2000 | Leymann | G06F 9/466 718/101 |
| 6,018,570 | A * | 1/2000 | Matison | H04M 3/42136 379/93.12 |
| 6,490,679 | B1 * | 12/2002 | Tumblin | G06F 21/602 726/1 |
| 7,219,260 | B1 * | 5/2007 | de Forest | G06F 11/1474 714/E11.131 |
| 9,503,512 | B2 * | 11/2016 | Nilsson | G06F 9/5066 |
| 10,043,030 | B1 * | 8/2018 | Kruse | G06Q 10/06 |
| 10,122,757 | B1 * | 11/2018 | Kruse | H04L 63/10 |
| 11,386,072 | B1 * | 7/2022 | Narayan | G06F 16/2365 |
| 11,573,969 | B1 * | 2/2023 | Han | G06F 16/248 |
| 11,630,917 | B2 * | 4/2023 | Fox | H04W 12/02 726/28 |
| 2004/0054903 | A1 * | 3/2004 | Monahan | G06F 9/547 713/168 |
| 2006/0178921 | A1 * | 8/2006 | Chuang | G06Q 10/06315 705/7.17 |
| 2007/0249323 | A1 * | 10/2007 | Lee | H04W 12/062 455/411 |

(Continued)

*Primary Examiner* — Jason Chiang
(74) *Attorney, Agent, or Firm* — HAYNES AND BOONE, LLP

(57) ABSTRACT

Systems, methods, and machine-readable media for organizing resources within a context, controlling access to resources, providing auditing capabilities based on the context, and granting permission to perform work using a single record object. A resource provider service may receive a request from a client. A record may be created in response to receiving the client request. The record may be associated with the requested work. The record may provide context for and permission to perform the requested work. The resource provider service may respond to the client acknowledging receiving the request. The resource provider service may record work to be done in response to receiving the request. The resource provider service may perform the work. The resource provider service may update the record indicating that work is being performed. The resource provider service may archive and/or remove the record when it has expired.

20 Claims, 11 Drawing Sheets

(56) References Cited

U.S. PATENT DOCUMENTS

| | | | | |
|---|---|---|---|---|
| 2009/0063691 A1* | 3/2009 | Kalofonos | | H04L 67/104 709/229 |
| 2009/0248475 A1* | 10/2009 | Choi | | G06Q 10/107 709/219 |
| 2010/0153475 A1* | 6/2010 | Zedlitz | | G06F 11/3447 707/E17.107 |
| 2010/0192204 A1* | 7/2010 | Boulos | | H04L 63/0823 726/4 |
| 2010/0218239 A1* | 8/2010 | Tang | | G06Q 30/02 705/310 |
| 2010/0318594 A1* | 12/2010 | Chien | | H04L 67/51 709/201 |
| 2012/0233670 A1* | 9/2012 | Bonnes | | H04L 63/105 726/4 |
| 2012/0246303 A1* | 9/2012 | Petersen | | G06F 16/1734 709/224 |
| 2013/0282419 A1* | 10/2013 | Braddy | | G06Q 10/10 705/7.15 |
| 2014/0123252 A1* | 5/2014 | Rowe | | H04L 63/102 726/6 |
| 2016/0378533 A1* | 12/2016 | Takeuchi | | G06F 9/5022 718/1 |
| 2017/0064038 A1* | 3/2017 | Chen | | H04W 12/08 |
| 2017/0230544 A1* | 8/2017 | Watts | | H04M 7/0024 |
| 2018/0191818 A1* | 7/2018 | Maddali | | H04L 47/803 |
| 2018/0295126 A1* | 10/2018 | Gilpin | | H04L 63/102 |
| 2018/0359336 A1* | 12/2018 | Chattopadhyay | | G06F 11/2066 |
| 2019/0020661 A1* | 1/2019 | Zhang | | H04L 63/0823 |
| 2020/0177564 A1* | 6/2020 | Arisankala | | H04L 9/0861 |
| 2020/0213116 A1* | 7/2020 | Fattal | | H04W 12/06 |
| 2020/0402049 A1* | 12/2020 | Pi Farias | | G06Q 20/208 |
| 2021/0117557 A1* | 4/2021 | Al-Shanqity | | G06F 21/6218 |
| 2021/0365859 A1* | 11/2021 | Prescott | | G06Q 10/06313 |
| 2022/0124095 A1* | 4/2022 | Cheng | | H04L 63/0861 |
| 2022/0207614 A1* | 6/2022 | McCullough, Jr. | | G06N 5/022 |

* cited by examiner

```
{
  <basic object property stanza UUID>: {
    "objectUUID": <some UUID>,
    "parentUUID": <some UUID>,
    "createTime": <some date and time>,
    "modifyTime": <some date and time>
  },
  <AERO record property stanza UUID>: {
    "objectUUID": <some UUID>,
    "createTime": <some date and time>,
    "modifyTime": <some date and time>,
    "originator": <user object UUID>,
    "request": <object containing arguments from original call>,
    "workspace": <workspace object UUID>,
    "audit": <object containing audit log information>
  }
}
```

500 — (502: basic object property stanza; 504: AERO record property stanza)

FIG. 5

CONTEXT TRACKING ACROSS A DATA MANAGEMENT PLATFORM

TECHNICAL FIELD

The present description relates to data organization and tracking within a storage system. More specifically, the present description relates to systems and methods for organizing resources within a context, controlling access to resources, providing auditing capabilities based on the context, and granting permission to perform work using a single record object.

BACKGROUND

Storage systems have expanded from simply being on-premises devices to the cloud, whether in a hybrid configuration, private cloud configuration, public cloud configuration, and so on. With that expansion, storage systems may include multiple, independent, inter-related, and inter-dependent components for managing the stored data. Each of these components may be created by different parties without knowledge of the other components while still having the expectation to work together as a cohesive unit. As a result, there arises unpredictable interactions between the different components within the storage system. In particular, a single component may receive a user request while an additional one or more unknown components may be expected to perform work based on the user request.

Problems arise, however, from this loose connection between components. Typically, there is no permission control resulting in the different components having access to all of the data and resources within a storage system. Additionally, there may be no concept of resource separation between different components. In particular, the lack of access control and authentication create problems for data protection and tracking work completed by different components.

BRIEF DESCRIPTION OF THE DRAWINGS

FIG. 5 illustrates an exemplary object definition of an AERO record used by a resource provider service architecture according to some embodiments of the present disclosure.

DETAILED DESCRIPTION

Figure 1:
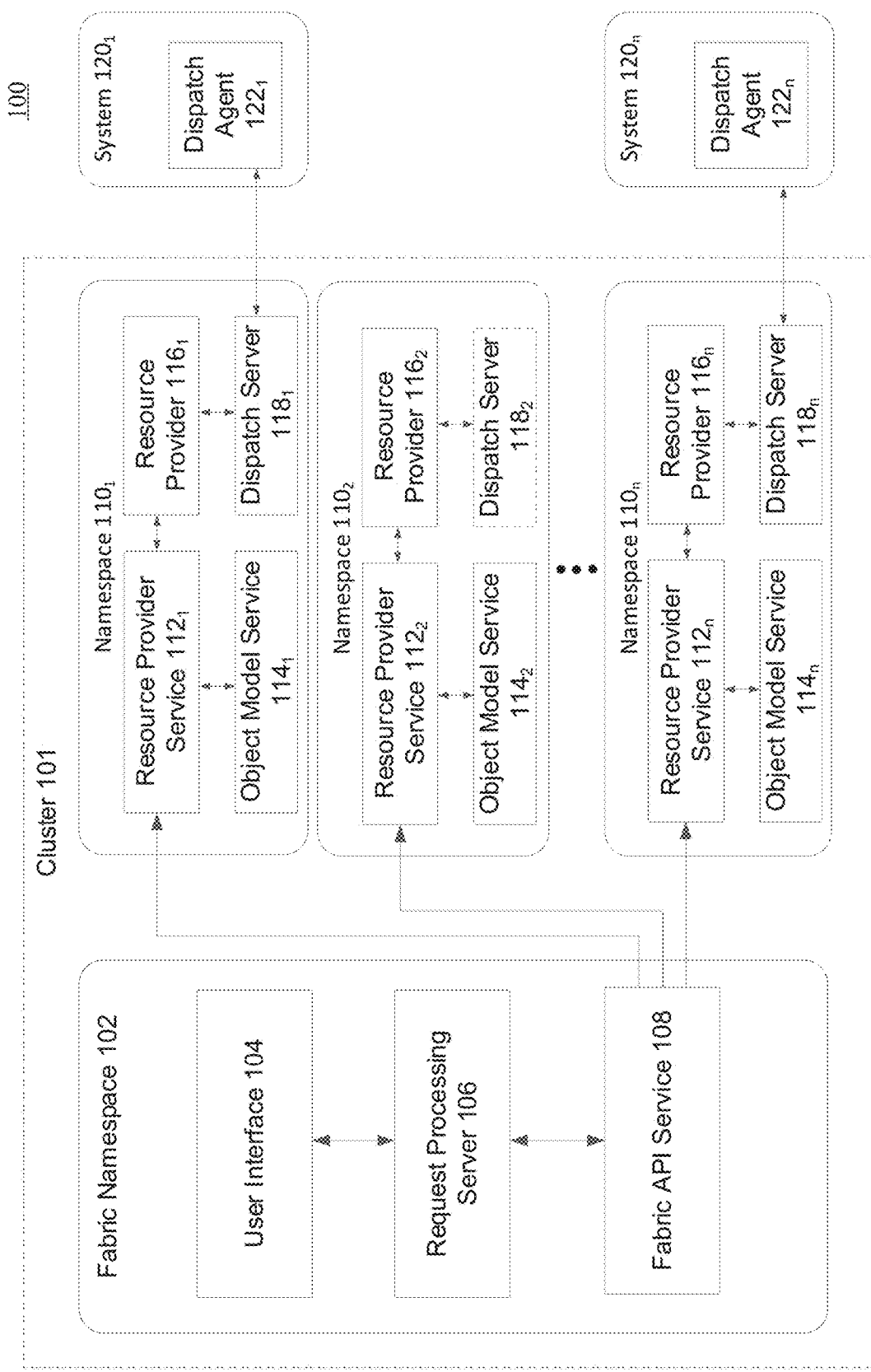
FIG. 1 illustrates an extensible data management platform architecture according to some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for organizing resources within a context, controlling access to resources, providing auditing capabilities based on the context, and granting permission to perform work using a single record object. In an embodiment, a data management architecture with centralized proxy includes a resource provider service, an object model service, and several application programming interfaces (APIs) exposed to a client through the resource provider service for managing a resource provider (via the resource provider service) that represents a resource, which represents a state of a system or group of systems. Some examples of resources include "file server storage volumes" and "point-in-time volume snapshots" (as just two simple examples).

According to embodiments of the present disclosure, resources may be represented within resource provider definitions. An instantiated resource provider definition, variously called a resource provider or resource provider instance, may be a running instance of an executable that supports the data format and interaction methods from the resource provider definition. As such, a resource provider definition may include associated references to an executable, such as an executable container, that becomes the instantiated resource provider. Further, the resource provider definition may be stored in an object model service, and further include other information such as credentials for accessing the container and configuration arguments, and API specification which the resource provider service may expose on behalf of the running resource provider.

According to embodiments of the present disclosure, resource separation may be accomplished through the use of labels. Each object in the object model service may include one or more labels that identify the object as belonging to a group defined by the label. A label may define the context and interaction between users, workspaces, resources, and resource providers. Furthermore, labels may be used to limit the visibility of resources to only those workspaces, users, and resource providers that share the same label.

To enable efficient use of the labels, an audit, event, request, and originator (AERO) record may be created and stored in the object model service. The AERO record may be created either as a stand-alone object, within a resource provider definition object, or within any other object stored in the object model service. In this way, every user request, action, resource, and object may be grouped and separated from others. The AERO record may provide the required permissions for a resource provider to perform a task in response to a user request. Furthermore, a resource provider definition object may include an AERO record thereby granting permission to the resource provider to perform necessary startup operations. In some examples, the AERO record may include a label field to define the workspace in which the object or action is permitted to operate. In such examples, the label within the AERO record may define the context in which the specific user request or resource provider is permitted to work. In some examples, the AERO record may not include a label field but instead inherit the labels, and therefore the context, of the object within which the AERO record is created. In this way, the labels can facilitate filtering information based on the context of the AERO record. Furthermore, AERO records may aid in audit logging of actions taken within the system. As actions are taken, the AERO record may be recorded to a log allowing visibility of which resource providers executed during the servicing of a request.

In operation, a user may access the resource provider service in an organization's namespace via a fabric namespace, which may also be referred to herein as either a data fabric namespace, or more generally as a namespace. The fabric namespace may correspond (implementation-wise) to orchestrator (e.g., Kubernetes) namespaces for tenant isolation (there also exist namespaces in an object model service that are used for aliases/translations, as discussed further with respect to various embodiments below). The user may contribute a resource provider definition to store in the object model service of the namespace (managed by the resource provider service) via an API call of the resource provider service. The resource provider definitions are formatted according to a metaformat, such that any type of data may be defined, and resources defined, so long as the overall resource provider definition complies with the metaformat. In this way, entities associated with the provider of the resource provider service, or third parties, may submit resource provider definitions for others to access. Any user (e.g., any user within the namespace having the appropriate label) may subsequently access the resource provider definition if it corresponds to a resource that the user seeks to manage. In this way, customers may define their data containers, and the granularity at which they want to manage their data, while enabling the customers to define their data, what it looks like, and how to manage it.

One or more event channels may be created for communicating events among the various resource providers within a namespace and context as defined by the labels. One or more resource providers may be instantiated as an event service for defining and hosting the event channels. Resource providers may publish events to the event channels as well as subscribe to event channels to receive event notifications. AERO records may be included in event notifications to allow for filtering of the event notifications. In this way, event notifications may be received by resource providers that contain the same label as the AERO record attached to event notification. In this way, the various resource providers within the organization's namespace may communicate with each other and operate as a cohesive unit without the explicit knowledge of the existence of the other resource providers. In this way, event channels and AERO records allow for asynchronous operations within the organization's namespace while still maintaining control over the context in which the operation is occurring and the permissions to perform the operations.

According to embodiments of the present disclosure, once the resource provider is instantiated, the resource provider may create event channels, subscribe to event channels, and/or publish to event channels. Additionally, the resource provider service may allow the user to make API calls (e.g., that have been authenticated and authorized) to operations during actual use of the resource provider. The resource provider service may proxy these commands during operation for the resource provider. As the resource provider performs the requested operations after proxying by the resource provider service, the resource provider may generate and publish event notifications thereby allowing other resource providers to perform operations in response to the event notifications.

Thus, the process of instantiating a resource provider may take a resource provider definition (which may be stored in the system already), and may cause the executable embodying the logic of that resource provider (e.g., a container may embody the logic) to begin executing with a particular set of arguments and/or custom values and within a specific context that may make the resource provider unique to the purposes of that user. That execution may be tracked by the resource provider service using the AERO record, and the API of the executable (the instantiated resource provider) may be exposed via the resource provider service to users upon instantiation. Operations may then be requested via the exposed API, which the resource provider service proxies for the resource provider instance. Further operations may be initiated via the various events generated by the resource provider instances.

As a result, embodiments of the present disclosure enable an extensible data fabric that accommodates communication between native definitions as well as third party plugins. The resource provider service, and related architecture, enable interoperability of managed resources represented within objects. The AERO record, including labels defined with the objects, further enables context filtering to limit visibility of objects and resource providers to their specified workspaces. The event notifications, including the AERO records, and event channels enable the native definitions and third party plugins to work as a cohesive unit without defining explicit relationships between each other. As a result, operations may be taken within the appropriate context of the organization's namespace by native definitions as well as third party plugins without knowing beforehand what the operation of the other definitions and plugins will be. The AERO record facilitates the necessary understanding of the context in which the resource provider may work such that data is properly isolated. Additionally, the AERO record provides the necessary permissions so that the various third party plugins may perform operations within the system.

FIG. 1 illustrates an extensible data management platform architecture 100 according to some embodiments of the present disclosure. The architecture may be implemented over a single node of a distributed computing system, or a cluster of nodes. Each node may be, for example, a different physical server, while in other embodiments different nodes may be run on the same physical server. In some examples, the architecture 100 may be orchestrated using Kubernetes, which is an open-source system for managing containerized applications. More particularly, Kubernetes aids in the management of containerized applications across a group of machines (e.g., virtual machines).

The extensible data management platform architecture 100 includes a fabric namespace 102, namespaces $110_1$-

$110_n$, and systems $120_1$-$120_n$ (e.g., on-premises, in the cloud, etc.—more generally, systems $120_1$-$120_n$ may be remote systems from the namespace 110, but accessible by the resource provider instance that manages the resource on the system 120). For example, the fabric namespace 102 and namespaces $110_1$-$110_n$ may exist within a Kubernetes cluster, such as a single cluster. Alternatively, one or more may be in separate clusters and in communication with each other over one or more networks. In addition to standard Kubernetes namespaces, the data fabric namespace 102 may be configured to provide a front-end of the architecture 100. This may include a user interface 104, a request processing server 106, and a fabric application programming interface (API) service 108. Aspects of the present disclosure may be discussed with reference to container and container-related implementations. This is for simplicity of discussion only. Aspects of the present disclosure are applicable to executables generally, such as virtual machine executables, uniform resource locator (URL) implementations where the URL receives some argument to perform a requested action (e.g., a URL to a REST API), a script, a compiled executable, etc. The examples described below may refer to container and container-related concepts to provide illustration of details of the disclosure.

The user interface 104 may include components used to handle user interfacing, and may include for example an API object that manages external access to the services in the cluster. This may be served out of a container through an ingress component to provide services such as load balancing, name-based virtual hosting, and/or secure socket layer (SSL) termination. For example, a user may login to a namespace (e.g., any of namespaces $110_1$-$110_n$ in examples of the present disclosure), such as for purposes of authentication and/or authorization prior to using features as discussed further herein. The request processing server 106 may be in communication with the user interface 104, for example receiving incoming requests that were received from a user through the user interface 104. The user interface 104 may facilitate authentication and display of information for users, with the underlying API(s) providing a way to prove user identity and gain authenticated access; if provided with a valid authentication token, for example, the API(s) may permit operations to proceed. While described with respect to interaction via user interface 104, in some other examples a user may directly address the API endpoints to accomplish tasks, or use one or more scripts to directly interact with a request processing server 106. In other words, based upon the services exposed by the request processing server 106, users may interact with the system via the user interface 104 or via scripted interactions directly to the underlying API(s). The request processing server 106 may then build a set of requests that may be used to obtain information identified in the incoming request. The request processing server 106 may then send the built set of requests to the fabric API service 108.

The fabric API service 108 may operate as a front-end to the organizational tenancy structure of the architecture 100. In this capacity, requests received via the user interface 104 may pass through the fabric API service 108, where the fabric API service 108 may authenticate the request. This may include, for example, authenticating the request's authentication token against internal data, e.g. authenticating against the request's auth0 token. More generally, a bearer token may be authenticated against any token-providing service, such as for example a simple internal token-to-user mapping service. If authentication is successful, the request may then be routed to the appropriate organization's namespace (e.g., $110_1$-$110_n$), and in particular to the appropriate resource provider service 112 of that namespace 110. Further, the fabric API service 108 may be configured to be able to dynamically update its API space based on the organizations it serves, as well as the resource providers (e.g., $116_1$-$116_n$) that are instantiated (if any) in each organization's namespace 110. Such functionality may allow for a restricted, whitelisted organization-based API space with a layer, such as a first layer, of access control based on the existence of a user in an organization and appropriate authentication information.

The extensible data management platform architecture 100 may also include, in addition to standard Kubernetes (or other construct) namespaces, one or more namespaces $110_1$-$110_n$. These namespaces, for example, may be ascribed to different tenants to maintain isolation of data and access. Each namespace 110 may include one or more of a resource provider service 112, an object model service 114, one or more resource providers 116 (e.g., instances of resource providers based on resource provider definitions stored with the object model service 114), and a dispatch server 118. For example, a namespace 110 may start with zero resource providers 116, with instances of resource providers 116 being instantiated over time.

For example, namespace $110_1$ may include a resource provider service $112_1$, one or more resource providers $116_1$ (when instantiated), and the dispatch server $118_1$. The resource provider service $112_1$ may be in communication with object model service $114_1$, as well as in communication with resource provider $116_1$. The resource provider $116_1$ may, in turn, also be in communication with a dispatch service $118_1$, which may be in communication with a system $120_1$ via dispatch agent $122_1$ (e.g., more generally referring to an agent that may be used to tunnel data in order to support management of other devices). While illustrated with one resource provider 116, any given namespace 110 may include zero or more resource providers 116 at any given point in time, depending on what a client requests be instantiated via the fabric namespace 102.

Namespace $110_2$ may similarly include a resource provider service $112_2$. Resource provider service $112_2$ may be another instance of the resource provider service $112_1$, just within a different namespace. Resource provider service $112_2$ may be in communication with object model service $114_2$, as well as in communication with resource provider $116_2$. The resource provider $116_2$ is not illustrated as being in communication with a dispatch service 118 because, in the illustrated example, the namespace $110_2$ is not in further communication with an on-premises system (or otherwise protected system), as namespace $110_1$ and namespace $110_n$ are (by way of illustration). For example, dispatch server 118 is optional. As a further example, namespace $110_n$ (an example showing that any number n of namespaces 110 may exist within the architecture 100 of FIG. 1) may include a respective resource provider service $112_n$. That resource provider service $112_n$ may be in communication with object model service $114_n$, as well as in communication with resource provider $116_n$. The resource provider $116_n$ may, in turn, also be in communication with a dispatch service $118_n$, which may be in communication with an on-premises system $120_n$ via dispatch agent $122_n$.

Referring generally to the resource provider service 112 within a namespace 110, this component serves as the API proxy for resource providers 116. For example, resource provider service $112_1$ may serve as the API proxy for resource provider $116_1$, resource provider service $112_2$ may serve as the API proxy for resource provider $116_2$, and resource provider service 112$_n$ may serve as the API proxy for resource provider 116$_n$. In general, each resource provider service 112 may serve as the API proxy for any number of resource providers 116 within the same namespace 110. For example, the resource provider service 112 may be responsible for instantiating the resource providers 116 within its namespace 110, as well as may be responsible for exposing the API(s) that the resource provider(s) 116 (that have been instantiated within the namespace 110) exposes. The resource provider service 112 may expose these APIs as proxied routes as described herein.

The resource provider service 112 may further provide an API endpoint for one or more resource providers 116 within the same namespace 110 (e.g., to maintain their resources). Further, a resource provider service 112 may provide a variety of system resources, including support for notifications and banners, a resource retrieval API for platform consumers, lifecycle functions for resource providers 116 (e.g., such as those within the same namespace 110), and/or activity and audit logging as some examples. Although any suitable API architecture may be used, for simplicity, a RESTful API architecture will be referenced below. The resource provider service 112 may be implemented as a software entity, such as a logically centralized REST API proxy that runs within the containers within a Kubernetes compute and storage cluster of networked computers (virtual or physical). In an embodiment, a container may be, for example, a Docker container or a CoreOS container. A container may refer to a standardized unit of software that packages executables and dependencies for those executables to allow for quick installation and ensure that the software runs as expected. In an embodiment, the container may be provided according to a container management format such as, for example, a Kubernetes Pod, a Mesos Containerizer, or a Docker swarm (to name a few examples). A container management tool may manage one or more containers of a similar format along with any shared storage or network connections and provides configurations for running the containers.

The resource provider service 112, generally, may utilize the object model service 114 for storage of objects representing information that may be used for operation of the resource provider service 112, as well as for storage for resources managed by executables to which the resource provider service 112 proxies access. For example, the objects may be JavaScript Object Notation (JSON) objects, or other types of objects (such as YAML (YAML Ain't Markup Language) or XML (eXtensible Markup Language) as two examples). Generally, then, the object model service 114 may be responsible for maintaining the resource storage and management in the architecture 100. This may include maintaining the Resource "definitions" as schemas (e.g., JSON schemas, such as Draft 4 or another) for the platform as well as for a corresponding resource provider 116 (e.g., instantiated based on a resource provider definition stored in the object model service 114). A schema may describe the format for content of an object (e.g., a schema might specify that a property key with a name may have a string of a given length for its value, so that a schema-compliant object may be a string of that length). Each object and schema may be internally accessed by a universally unique identifier (UUID), and each schema may be internally represented as the names for stanzas by the UUID for that respective schema. A UUID may be, for example, a hexadecimal character string (such as 32 hexadecimal characters as one example).

The object model service 114 may further be responsible for providing one or more namespaces. These namespaces provided for by the object model service 114 may be distinct from the namespaces 110 illustrated in FIG. 1, for example existing for the convenience of human access so that programmers may work with friendly names (that may be associated with one or more UUIDs) instead of UUIDs directly when working with stanzas within objects. The object model service 114 may also be responsible for allowing the insertion of aliases and translations into the namespaces provided by the object model service 114. Further, the object model service 114 may be responsible for validating inserted Resources against the schemas, and/or storing and retrieving the Resources and their accompanying metadata. This extensible object model may allow for the composition of Resource "stanzas" using cooperating resource providers (e.g., providers 116) and other components of architecture 100. This may give the overall system flexibility to support complex resource models that may be collectively maintained (e.g., in the object model service 114). The object model service 114 may further provide a RESTful API (as an example) that is available to the resource provider service 112 (but which might not be directly available to any other components), such that resource operations performed by any resource provider 116 might be performed using the resource provider service 112's RESTful API. For example, access from the resource provider 116 to the object model service 114 via the resource provider service 112 may be allowed in order to permit easier auditing of those accesses and logical centralization of triggerable actions based upon access of different types.

The object model service 114 may create its own schema for basic properties for schema objects and other objects. This may be done at bootstrap, for example. Subsequent schemas and objects may comply with this basic schema (e.g., also referred to herein as a system schema). As one example, some basic properties of a schema or object may be an object UUID, a parent UUID, a create time, and a modify time. The date and time information may be strings (e.g., alphanumeric strings, or strings that may include other printable characters such as semicolons and periods, etc.) in a format such as ISO 8601, and may be formatted with a UTC time base. Phrases within an exemplary object may be delimited, such as with "<" and ">", which may be placeholders for the concept represented between the delimiters. The basic schema may be a special schema for objects where the object UUID and parent UUID equal each other. Further, a meta schema may be used to indicate that an object consists of one or more schema stanzas. For example, the meta schema may describe that objects consist of contents identified by UUID and object information, e.g. <schema UUID>:<object> contents. Schema definitions, e.g. JSON Schema definitions, may exist for the meta schema, schema definition(s), and object definition(s). In general, the object model service 114 may store one or more schema definitions according to a schema, and objects according to a meta schema that references schema definition(s) by UUID (with optional translation via an object model service namespace).

When a schema is installed in the object model service, it may be represented as an object with a basic property stanza and an object (e.g., a JSON object) to hold its own schema (e.g., JSON schema), for example according to a meta schema. As used herein, therefore, a stanza may refer to a separable, self-contained, stand-alone unit of information. The name of each stanza may map back to a JSON schema. At install time, the new schema may be validated (for example, to avoid accepting, storing, and applying an illegal schema). The format for schema objects may be pre-defined and expected to consist of several components, such as two including the basic object properties and the schema component. Thus, there may be two stanzas for a schema object: an "object" stanza and a "schema" stanza. The object stanza may contain the properties described above (e.g., the basic properties that the object model service 114 creates such as at bootstrap).

The schema stanza may contain a JSON schema, and conform to JSON Schema rules (e.g., Draft 4). Reference to JSON and JSON schema is by way of example only. More generally, a data format and description of what content is considered allowable for the data format may be used for an object/representation of data. Embodiments of the present disclosure may use any appropriate representation of data objects (such as JSON) and a meta-description/schema that may describe what the content of an object is allowed to be (e.g., what should be included, what is optional, etc.), and any acceptable formats for that content (e.g., string, integer, date, nested-object, etc.). Reference is made to JSON and JSON schema herein for ease of discussion and illustration, with the concepts applicable to other data formats as noted. To represent the properties of a schema in an object, the object may appear with the object UUID of a schema object as the name for the object property stanza(s). As a result, the object model service 114 may be able to look up the referenced schema and validate the contents of that object property stanza.

There may be multiple instances of different schema-defined object property stanzas within a given object, which gives the overall object model of the object model service 114 flexibility. Flexibility comes down to how the object model may be used. The schema-defined stanzas support the flexible object model. An object may be created with an initial set of stanzas, more schemas may be added to the system, and then more stanzas may be added to the initial object with the new stanzas. Additionally, one or more stanzas may be removed, or have their contents modified, over time. This flexibility may allow new use cases for objects to be added at any time. This same flexibility may allow for cooperating within a given object by adding use-case-specific object property stanzas where the contents of each stanza may be viewable by users of the object model service 114, and where each stanza's schema may be consulted to learn details of their semantics.

Given that the object model service 114 may track UUIDs as the names for schema-defined stanzas, and given that UUIDs are often not easily interpreted or understood in their native form, the object model service 114 may further be configured to translate from UUIDs to legible character strings. The translations may be defined within namespaces (e.g., within object model service 114, as opposed to namespaces 110). The translations may be used by the resource provider service 112 to hide the existence of the UUIDs so that a resource provider 116 might be exposed to the translated UUID, as opposed to the "raw" UUID. Further, a limit might not be enforced on the number of namespaces and/or the number of translations/aliases per namespace. In this context, a namespace may refer to a logical container for aliases. Each alias may translate from an input argument to an output (the translation). The object model service 114 may be requested to use aliases from a particular namespace when translating inbound/outbound object arguments. The object model service 114 may use, internally, schemas and objects to manage the namespace and alias feature. The author of a resource provider 116 may be able to define every aspect of the resource using schemas,
such as JSON Schemas, and map those schemas to aliases as noted. These aliases, then, may be short-hand common names that automatically map from a specific resource stanza to the defining schema.

The resource provider service 112 may instantiate one or more resource providers 116 from corresponding resource provider definitions within the object model service 114. A resource provider definition may be the package of data format and interaction methods used to instantiate a resource provider 116. Thus, a resource provider 116 may be schemas and pieces of code that define the resources that the resource provider 116 represents within the architecture 100, that create a RESTful API that the architecture 100 can utilize to assist in the retrieval and management of those resources, and that implements the code behind the RESTful API that will actually perform the retrieval and management of those resources. A resource provider definition may support zero or more data definitions, up to any number of data definitions. A resource provider definition with zero definitions may be an observer and/or use already existing resources. Resource provider definitions that contain a large number of definitions (e.g., as defined either by a threshold set automatically or by a user, or by one or more capabilities of the system(s) in operation, etc.) may, if they become too large, be factored into multiple smaller resource provider definitions. This may be useful, for example, in situations where a system might impose a limit on how many data definitions can be proposed or installed by a resource provider definition—re-factoring may be thus used to circumvent such limitation. The resource provider 116 may be a running instance of an executable that supports the data format and interaction methods specified in a resource provider definition.

A resource provider definition, stored in the object model service 114, may include a JSON object and associated external references to an executable, such as an executable container. The container may be the executable to be run for each resource provider 116 that is instantiated from that resource provider definition. The JSON object may include a reference to a repository location (such as a Docker repository location) from where the executable container can be downloaded. The JSON object may also include the credentials used for accomplishing a download of the container, as well as a schema describing configuration arguments (such as those needed to craft a unique resource provider 116 instance from the resource provider definition from the object model service 114), a set of mandatory configuration arguments (such as network ports), an API specification (such as OpenAPI), a definition of the API implemented by the executable container (such as a REST API), and JSON schema definitions of resource objects to be managed by the instantiated resource provider 116.

As used herein, "resources" (or "resource objects") may refer to objects that are stored in the architecture 100. Resources are how the state of a system, or a group of systems, may be reflected within the architecture 100, and how management capabilities may be provided to those systems. Some simple examples of resources may be "volumes" and "snapshots" (as two simple separate examples). Another example could be, for example, a representation of a building management system. There may be a building management system resource provider (e.g., instantiated from a corresponding resource provider definition) with defined resources such as thermostats, door sensors, light sensors, occupancy sensors, controllable lights, etc. As these examples illustrate, a resource provider 116 may be a representation of the underlying resource(s) that provides a level of access/management at the given level of granularity for that resource per the resource provider definition from which the resource provider 116 is instantiated. In operation, the resource provider 116 instance may communicate with the actual physical entity(ies) (the "resources") and reflect their current state into the object model service 114 (and manage them via one or more API calls from a client exposed via the resource provider service 112). Further, as commands are received to manipulate the actual physical entity(ies) via the resource provider 116, an update to the actual physical entity(ies) may occur as well corresponding to the changed state updated into the object model service 114. Thus, where a resource provider 116 instance API receives a command to cause an object to be created, that object would be created at the actual physical entity(ies). As another example, where the resource provider 116 instance represents an NFS file server and receives a command for a storage volume to be created, an actual corresponding volume would be created at the actual, managed NFS file server (in addition to the state being updated at the object model service 114).

The concept of resources may be taken further within embodiments of the present disclosure. For example, the architecture 100 (such as via the resource provider service 112) may provide metadata to the resources including basic system information such as creation time, last modification time, and resource parent. The metadata may also include resource information, such as display name, and a set of external IDs that allow for a resource provider 116 to map from an external resource identifier to a unique identifier within the system that the resource is representing.

Further, an object in the architecture 100 may be an amalgamation of several resources, created and maintained by one or more resource providers 116. It is through this composition mechanism that the architecture 100 may add the metadata and resource information maintained on a per-resource basis. Thus, a developer may create a generic/specific set of resource providers 116 that cooperatively may maintain resources for several types of systems. The object model may enable cooperation of the generic/specific set of resource providers. This cooperation may allow the generic resource provider to have some basic understanding of the interface supported by the specific resource provider(s).

When a user seeks to instantiate a resource provider 116, they may send a command via the fabric namespace 102 (through user interface 104, request processing server 106, fabric API service 108, etc.), that is routed to the appropriate namespace 110. The resource provider service 112 in the appropriate namespace 110 may be waiting for the command, in the form of an API call as an example, to create a running instance of a resource provider definition stored in the object model service 114. The command, such as an API call, may define the necessary configuration parameters to use to instantiate the resource provider 116 from the definition. Herein, discussion will refer to API calls for simplicity, though the command and related communication may refer to other types of communication instead or in addition, such as passenger-pigeon, remote procedure call (RPC), a custom protocol, a "mailbox and doorbell" implementation, and/or polling. With this, the resource provider 116 is instantiated. The resource provider 116, when running, may provide access to manage resources defined by the data format described in the resource provider definition, and which the resource provider service 112 had before installed in the object model service 114.

The resource provider service 112 may proxy an interface of the resource provider 116 instance (e.g., an OAS3 interface) to clients. The resource provider service 112 may proxy interactions from the resource provider 116 instance to create, modify, and/or delete objects stored in the object model service 114. Further, the resource provider service 112 may proxy read access to objects (such as resource provider definition(s)) stored within the object model service 114 as well (which might not be directed at the resource provider 116 instance). In some examples, only resource provider 116 instances that derived from a resource provider definition that defined a given data format may alter the contents of the record(s) conforming to that format, while any resource provider 116 instances (e.g., those that are not derived from that resource provider definition) may read the contents of sub-components of objects. That is, while any accessor of an object can read the contents of all stanzas of that object, only a resource provider 116 instance derived from the resource provider definition that introduced a particular stanza definition might be able to modify those stanzas.

As illustrated, resource provider 116 instances may be in communication with a dispatch server 118. As illustrated, for example, resource provider $116_1$ in namespace $110_1$ may be in communication with dispatch server $118_1$. Further as an example, resource provider $116_2$ of namespace $110_2$ may be in communication with optional dispatch server $118_2$. Where there is no on-premises system 120 to connect with, the dispatch server $118_2$ may be omitted. The dispatch server 118 generally may provide for a capability that allows for communication between the cluster 101 and on-premises systems 120 (or otherwise protected systems wherever they may exist across one or more networks, such as in the cloud, etc.). The dispatch server 118 may reside within the cluster 101, or may be an external service that one or more components of the cluster 101 connect to for punching through firewalls wherever they may exist across the Internet to allow a resource provider 116 to connect to an on-premises system 120. A dispatch agent 122 may reside in a given on-premises system (or otherwise protected system). Thus, as illustrated a dispatch agent $122_1$ may reside in on-premises system $120_1$, and dispatch agent $122_n$ may reside in on-premises system $120_n$.

In operation, a dispatch agent 122 may open a connection from the dispatch agent 122 to a corresponding dispatch server 118. The dispatch server 118 and the dispatch agent 122 in communication may use the existing connection opened between them as a tunnel to send information between an entity that connects to the dispatch server 118 (e.g., one or more resource providers 116 within a namespace 110) and the entity connected to the corresponding dispatch agent 122 (e.g., a corresponding on-premises system 120).

The cluster 101 may further include a logging subsystem, such as within fabric namespace 102 and/or within one or more of the namespaces 110, that pulls logs from the containers and stores them. Examples of logging stacks may include Elastisearch, Fluentd, and/or Kibana to name just a few. A microservice gateway may also reside in the cluster 101 that may provide a filtered view of the logging data through the fabric API service 108 to the user interface 104.

In some examples, the resource provider service 112 may also be configured to perform operations at bootstrap. For example, at bootstrap the resource provider service 112 may ensure that it can contact the object model service 114. If so, the resource provider service 112 may read one or more objects stored in the object model service 114 to recover any existing configuration, and/or create missing configuration objects. The resource provider service 112 may discover one or more resource provider 116 instances that may be expected to be running and, upon discovering any, may start those that the resource provider service 112 finds missing from the cluster 101. Further, during steady-state operation, the resource provider service 112 may respond to API requests that cause it to manage resource provider definitions and resource provider 116 instances. The resource provider service 112 may also, during steady-state operation, respond to API requests that cause it to proxy access to the APIs of resource provider 116 instances and to the object model service 114 as further discussed below.

The extensible data management platform architecture 100 may facilitate convergence of multiple, independently-defined data formats from multiple resource provider 116 instances, as sub-components of objects, may allow for a single container of information or object to host a multitude of inter-related information. This may allow, for example, a resource provider 116 instance defined by the provider of the architecture 100 to interact with other resource provider 116 instances defined by the same provider. It may also allow interaction with third-party resource provider 116 instances—that is, instances from resource provider definitions submitted to the architecture 100 from a third party to the provider of the architecture 100.

As an example, the provider of the architecture 100 may define a resource provider for an NFS (Network File System) volume and another for a snapshot tool that has received information informing it to assist with coordination and management of snapshots of specified NFS volumes. After both are instantiated as resource providers 116 respectively, they may coordinate and manage snapshots of particular NFS volumes per their definitions. As another example, third-party resource provider 116 instances may interact with each other. As an example, a third-party (e.g., a customer of the architecture 100, a contract developer, a startup, etc.) may interact with the NFS volume resource provider 116 to extend functionality via an information lifecycle management (ILM) annotation (e.g., as an object sub-component with a resource provider 116 instance to enable ILM functionality).

As can be seen, there can be many parties with access to the cluster 101 (e.g., provider of the architecture 100 as well as third-party contributors, etc.). Each may have a vested interest in conveying and consuming information about the "state" of a managed data resource (examples of states being e.g., ready, in-progress, deleted, unavailable, retrying, successful to name just a few examples). The resource provider service 112 may further include a state mechanism that provides a data structure with two elements, a sentiment (which may be represented as an integer value, such as between −100 and 100 or some other range), and a message (which may be a free-form text string that may be conveyed to parties interested in the status of a resource). A small set of conventions regarding the use of this data structure may allow many use cases for conveying the status of resources in the cluster 101 to be addressed.

Without a simple, compact, and centrally managed mechanism such as the state mechanism, each contributor or other component of the architecture 100 may otherwise have had to author its own solution for conveying state information and teach others about its particular implementation. Furthermore, in an environment where there are unpredictable third-party providers of code that define their own custom resources, the state mechanism may be a standardized means for providing information to the overall cluster 101. By applying machine learning techniques to preserved state mechanism information, interested parties may learn about the internal state transitions of third-party code and develop models predicting outcomes based upon initial conditions that are of value to the provider of the architecture 100 and/or its customers. For example, the provider of the architecture 100 may build machine learning models that predict outcomes based upon initial condition and feed this information back as a "value add" to interested customers.

In some embodiments, the state mechanism may be an opt-in mechanism. For example, the existence of the state mechanism may allow for the user interface 104 (e.g., presented via a graphical user interface) to auto-create progress bars and display other graphical elements without having explicit knowledge of the underlying system. The state mechanism may be a generic means by which the sentiment and message may be conveyed to parties interested in the status of a resource. The sentiment, which again may for example take an integer value between −100 and 100 (as just one example, and where the extremes may be assumed to be terminal states), and the flexibility of the integer value, allows for negative sentiment to be conveyed with negative numbers (e.g., −25 representing the first failure out of 4 attempts at retrying an operation) and positive sentiment with positive numbers (e.g., 40 representing 40% progress through an operation, 100 representing an expected terminal "success" state for a resource).

Further, the state mechanism may have its own schema installed by a resource provider service 112 in the object model service 114. This may allow the state mechanism to have its own stanza to be stored within objects. This may enable state to be tracked on a per-stanza basis within objects (e.g., the state mechanism can track the state of multiple stanzas within a single object). A resource provider service 112 may provide an API, such as a REST API, endpoint for manipulating the state for a particular object property stanza within a particular object. Since "objects," as already noted, represent "things" within the architecture 100, objects may be composed of individual object property stanzas that are each defined by specific installed schemas (e.g., JSON Schema) at the object model service 114. The resource provider service 112 may track the name of each of these stanzas, and the state mechanism can allow the resource provider service 112 to track the sentiment and message for particular stanzas within an object with its own stanza that is hosted within the object.

An exemplary JSON object with the state mechanism included may look like:

```
{
  "baseobject": {
    "objectUUID": "<some object UUID>",
    "parentUUID": "<some object UUID>",
    "createTime": "<some time and date>",
    "modifyTime": "<some time and date>"
  },
  "some object property stanza": {
    "some property": "some value"
  },
  "another object property stanza": {
    "another property": "some value"
  },
  "statemechanism": {
    "some object property stanza": {
      "sentiment": 50,
      "message": "create in progress, half-way done!"
    },
```

```
    "another object property stanza": {
        "sentiment": -33,
        "message": "first of 3 retries failed"
    }
  }
}
```

The state mechanism may be useful according to embodiments of the present disclosure because it is simple (the sentiment as a simple integer value, and the message as a free-form text field), applicable to zero, one, or multiple object property stanzas within a single object (if zero, it would not be present), is interpretable by the user interface 104 with zero foreknowledge (which may be key to easy interoperability of independent code, e.g. from third parties), provides a basis for machine learning, and/or may capture events interpretable as good with positive numbers and those interpretable as bad with negative numbers (or some other arrangement).

Figure 2:
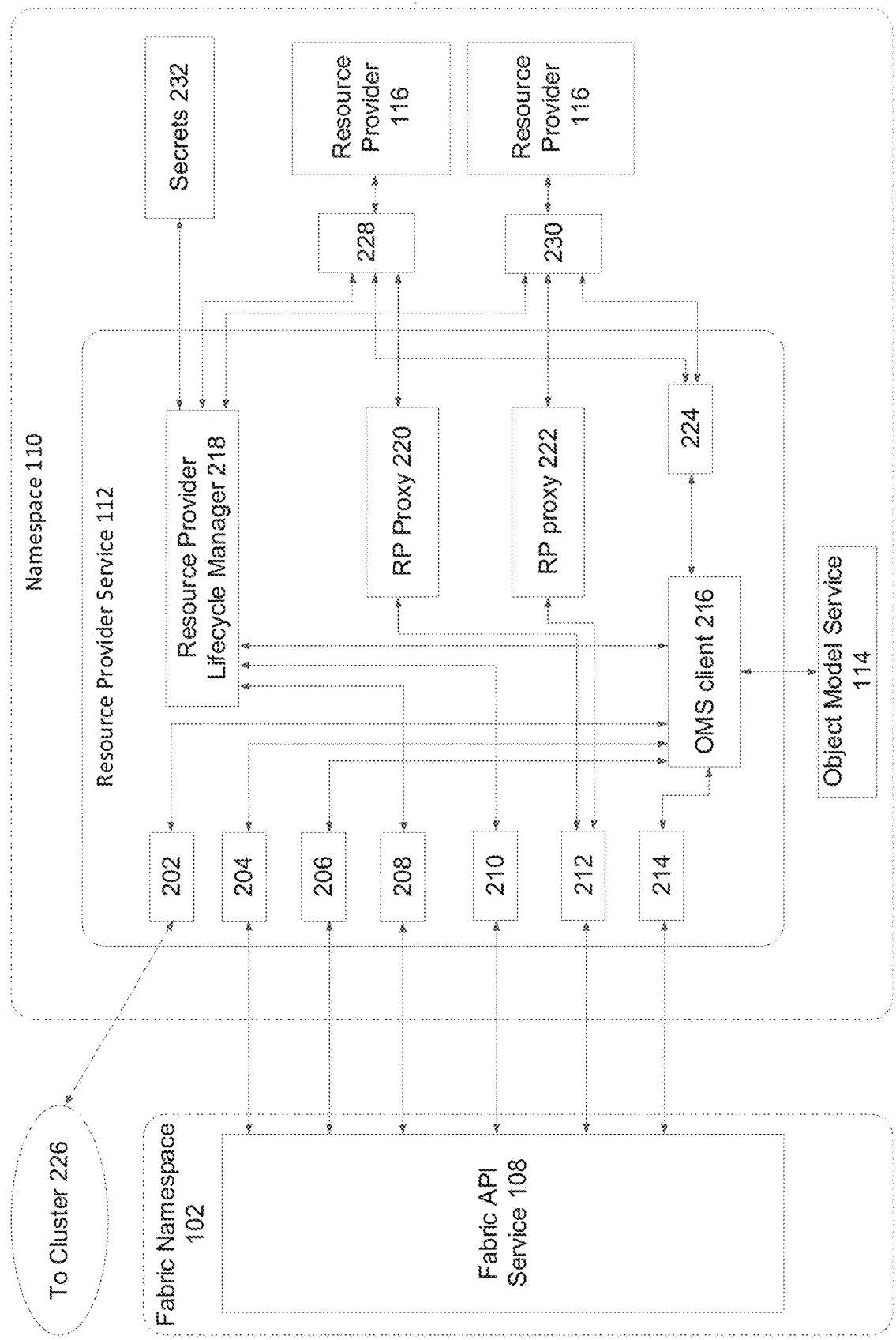
FIG. 2 illustrates a resource provider service architecture of an extensible data management platform architecture according to some embodiments of the present disclosure.

Additional operational details of the architecture of FIG. 1 will now be described. FIG. 2, specifically, illustrates a resource provider service (e.g., resource provider service 112 from FIG. 1) architecture of architecture 100 according to some embodiments of the present disclosure. Components introduced with respect to FIG. 1 will be referred to with the same reference numbers, with additional details provided herein with respect to components of an exemplary resource provider server 112 that are useful in describing aspects of operation of the components according to embodiments of the present disclosure. Aspects of FIG. 1 not illustrated in FIG. 2 are merely for the purpose of highlighting those aspects illustrated in FIG. 2, and are still interoperable as discussed elsewhere herein.

Resource provider service 112 includes several APIs, illustrated as APIs 202, 204, 206, 208, 210, 212, and/or 214 (that is, the resource provider service 112 may include some subset of APIs 202-214 or all of them and/or more). The resource provider service 112 may also include an object model service (OMS) client 216. The OMS client 216 may be the interface within resource provider service 112 for communication with the object model service 114. In some implementations, OMS client 216 may be optional, with some or all of the components within the resource provider service 112 logically communicating with the OMS 114 via some other path, either through another client or directly in connection with the OMS 114. The resource provider service 112 may also include resource provider lifecycle manager 218, which may be in communication with at least APIs 208 and 210, as well as with the object model service 114 via OMS client 216.

The resource provider lifecycle manager 218 may be in communication with the deployed resource providers 116 that are currently instantiated and in operation. When a resource provider 116 is deleted, that connection is removed. For example, the resource provider lifecycle manager 218 may be in communication with instantiated resource providers 116 via services 228, 230 (two illustrated for two active resource providers 116 by way of illustration only—there may be more or fewer depending on how many resource providers 116 are currently in service). In addition, the resource provider lifecycle manager 218 may also be in communication with secrets 232, such as Kubernetes secrets, that are created together with the service 228 or 230 (e.g., one-to-one relationship between Kubernetes secrets and service 228 or 230), and deployment for the resource providers 116. Thus, while one secrets 232 is illustrated, it may be in communication with both resource providers 116, and/or exist as distinct secrets 232, one for each resource provider 116.

The resource provider service 112 may also include resource provider (RP) proxy 220 and RP proxy 222. Two RP proxies 220 and 222 are illustrated to correspond with the two instantiated resource providers 116 illustrated in FIG. 2. There may be a different RP proxy dynamically created each time another resource provider 116 is instantiated from a client command, and deleted when the corresponding resource provider 116 (that is, a resource provider instance) is deleted by a client command. In some implementations, the RP proxies 220 and/or 222 may be optional, with some or all of the components within the resource provider service 112 logically communicating with the instantiated resource providers 116. The resource provider service 112 may also include internal APIs 224, which may refer to resource create/read/update/delete (also referred to as CRUD) operations that a given resource provider 116 may call within the resource provider service 112. Generally, the internal APIs 224 may refer to internal API REST endpoints, or internal API handlers. As illustrated, the internal APIs 224 are in communication with the instantiated resource providers 116 so that they may make the internal API calls, with communication with the object model service 114 via OMS client 216. While illustrated as communicating with the object model service 114 via OMS client 216, as noted above where OMS client 216 is not included, the internal APIs 224 may still communicate logically with the object model service 114 via some other path. As noted above, in some examples, only resource provider 116 instances that derived from a resource provider definition that defined a given data format may alter the contents of the record(s) conforming to that format (e.g., via internal APIs 224), while any resource provider 116 instances (e.g., those that are not derived from that resource provider definition) may read the contents of sub-components of objects (again, e.g. via internal APIs 224).

API 202 may refer to a resource provider service management API, which may be used in cooperation with an in-cluster command (e.g., to cluster 226), such as a command defined in a command-line program for interaction (e.g., via HTTP/HTTPS), that can go through the set of resource provider service system APIs and may be in communication with the OMS client 216. API 202 may be used for the management of the resource provider service 112 and, in some embodiments, may further be used to assist in the installation and deletion of resource providers (e.g., in cooperation with API 208 and/or API 210).

API 204 may refer to a notifications API. This may include APIs used for notification handling for the resource provider service 112. API 206 may refer to an activity log API, which may include APIs used for activity log handling for the resource provider service 112. These may be used for activity and audit logging. For example, a resource provider 116 may wish to have endpoint actions for operations such as POST, PUT, and/or DELETE (to name a few) be recorded in an activity log. If so, the resource provider 116 may expose properties such as activity messages including a summary, a message, a failure message, and/or tags. While not illustrated in FIG. 2, one or both of APIs 204 and 206 may also be available to resource providers 116, and therefore there may be an additional connection from resource providers 116 to APIs 204/206 (e.g., directly, or through other components such as service(s) 228/230, resource lifecycle manager 218, and/or object model service 114.

API 208 may refer to a resource provider definition API. This may include APIs used for adding new resource provider definitions to the object model service 114 via OMS client 216. This includes APIs for retrieving definitions from the object model service 114 to modify existing definitions, as well as APIs for storing definitions newly provided from clients of the cluster 101 that are validated (e.g., against the schemas in cooperation with the object model service 114). As noted above, the resource provider lifecycle manager 218 may be used as the interface with the resource provider definition API (API 208) to communicate with the object model service 114.

API 210 may refer to a resource provider instance API. This may include APIs used for instantiating a resource provider 116 via a resource provider definition stored in object model service 114. The API 210 may also be managed via the resource provider lifecycle manager 218, and thus the API 210 may be in communication with the object model service 114 through the resource provider lifecycle manager 218 and the OMS client 216. These APIs include those capabilities for handling the instantiation of a resource provider from the information stored in the object model service 114 and parameters included with the client command making the API call via API 210 to instantiate a resource provider 116.

API 212 may refer to a resource provider's create, update, and delete (also referred to as CUD) API. This may refer to API calls to operations that may be called during actual use of a given resource provider 116. The CUD APIs therefore refer to those API commands that are proxied by the resource provider service 112 on behalf of any resource providers 116 current in service on behalf of given resources. This is why API 212 is illustrated as being in communication with RP proxy 220 and RP proxy 222. When a client sends an API command for resource provider 116 connected to RP proxy 220, the resource provider service 112 functions as a proxy for the command, described above as the resource provider service 112 proxying an interface of the resource provider 116 instance to clients. Further, when a client sends an API command, the resource provider service 112 may limit passage of API calls to only those for which the resource provider service 112 has validated the client's identity and determined that the client has permission to use that API.

API 214 may refer to a resource retrieval API. This may include APIs to get a resource provider definition from the object model service 114 via the OMS client 216 (e.g., where included). As such, the API 214 may be the mechanism by which the resource provider service 112 proxies read access to objects within the object model service 114 (such as resource provider definitions and/or resource provider instance state tracking object(s)). More generally, the API 214 may expose functionality for retrieval of all objects in the object model service 114. The API 214 may allow for some selectivity in the returned information, including ensuring that only permitted objects are returned to the requesting party. For example, a user may use the API 214 as the general path for learning about the state maintained within the system by one or more resource providers 116 (including changes to the state of one or more aspects of the system that reflect one or more changes triggered via corresponding resource provider 116 instance(s) that received appropriate command(s)).

As can be seen from the illustrated aspects of FIG. 2, a resource provider service 112 may be API driven, and may handle not only its own API but also proxied APIs of one or more resource providers 116 that the resource provider service 112 has instantiated.

Figure 3:
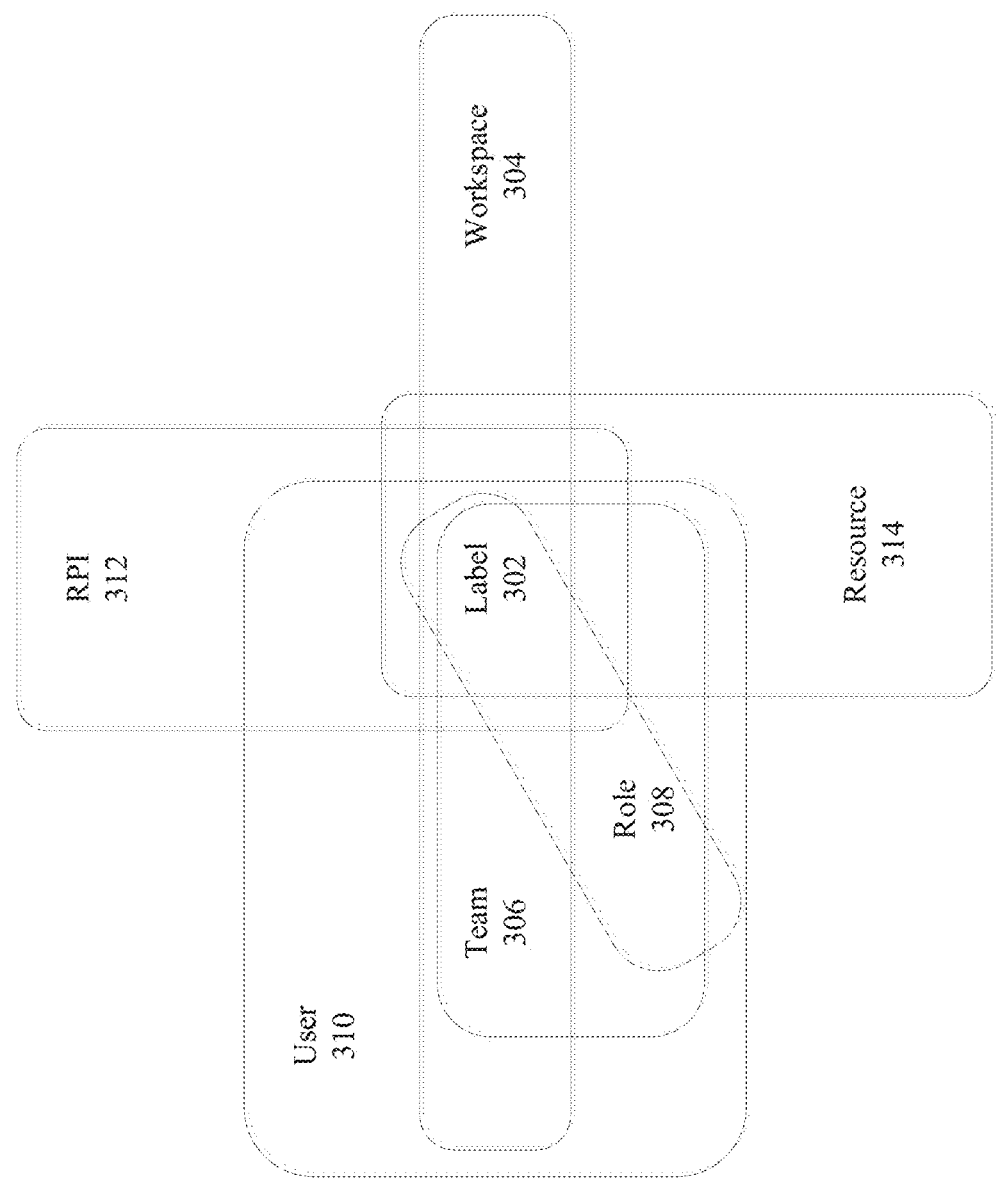
FIG. 3 illustrates an exemplary relationship diagram of objects within the extensible data management platform according to some embodiments of the present disclosure.

Turning now to FIG. 3, an exemplary relationship diagram of the extensible data management platform architecture 100 is illustrated according to some embodiments of the present disclosure. FIG. 3 illustrates the logical relationship 300 between different components of an extensible data management platform, the data stored in the system, and the users of the storage system. In some embodiments, the system may be the extensible data management platform architecture 100 illustrated in FIG. 1. In the extensible data management platform, the data may be stored as objects in object storage, such as for example the OMS 114. Access to objects within the extensible data management platform is filtered through the use of labels, such as label 302. In some embodiments, each object within the extensible data management platform may include a label 302. In some embodiments, each object within the extensible data management platform may include more than one label 302. In some embodiments, objects including a label 302 include workspace objects 304, team objects 306, role objects 308, user objects 310, resource provider instance (RPI) objects 312, and resource objects 314. Each of these objects may include a label 302 that defines a relationship between each object and the context within which each object exists.

A label 302 may be attached to every object stored in the extensible data management platform. In some embodiments, label 302 may be a stand-alone tag. In some embodiments, label 302 may be represented as a key/value pair stored as a string within an object. In some embodiments, the key/value pairs of label 302 may be stored in an object along with a UUID so that the UUID is associated with the label object 302. In such embodiments, the UUID of the label object 302 may be stored in a label field of another object instead of storing the string/value pair in the other object. Representing the key/value pair as a UUID may be done to protect the information stored in the string key/value pair. In some embodiments, label 302 may be cryptographically signed to allow definitions and third party plugins within the extensible data management platform to authenticate the label 302.

A workspace may be a collection of all objects within a namespace 110 having a specific label 302. A workspace object 304 may include a base object (including a workspace UUID), a label stanza (including one or more labels 302), and workspace properties (including label conditions and a team list). Label conditions may, for example, define the scope of the workspace which includes which labels 302 are considered to be a part of a workspace. The scope of the workspace may be considered the context of the workspace. The team list may include a list of team UUIDs that may have permission to access objects within the defined workspace. In general, a workspace may define an organization of objects having one or more labels in common in order to control access to and maintain separation of the objects. Access to the objects within a workspace may be limited to the team(s) identified in the team list within the workspace object 304. Additionally, a namespace 110 may include one or more workspaces, each defined by a unique workspace object 304. For example, namespace 110$_1$ may include a first workspace defined by a first workspace object 304$_1$ and a second workspace defined by a second workspace object 304$_2$. In this manner, the objects stored in the OMS may be filtered such that the first workspace only has permission to access objects associated with the first workspace and the second workspace only has permission to access objects associated with the second workspace.

A team object 306 may define a team within the extensible data management platform. A team object 306 may include base object properties (where the object UUID is used as the team UUID), team properties, and a label stanza. In some embodiments, team properties may include a list of users and a role granted to those users. Additionally, as above, the label stanza of a team object may include a list of labels, where each label may grant the team access to the workspaces and objects having the same label. For example, as discussed above, a workspace object 304 may include a team UUID that may grant permission to a specific team to access objects associated with the workspace defined by the workspace object 304. In some embodiments, only team objects 306 having a label 302 that satisfies the label conditions of the workspace object 304 may be granted permission to access the workspace. The team object and the associated users and role may share labels compatible with a workspace being accessed.

A role object 308 may define access controls to objects within a workspace. A role object 308 may include base object properties (where the object UUID is used as the role UUID), role properties, and a label stanza. In some embodiments, role properties may include specific access controls and/or privileges associated with the role. In some examples, one role may be reserved for administrative level access and/or privileges. In some examples, a second role may be reserved for normal access and/or privileges. In some examples, the label stanza may include one or more labels that satisfy the label conditions defined in a workspace object 304 thereby making the role visible within the workspace.

A user object 310 may define a user within the extensible data management platform. A user object 310 may include base object properties (where the object UUID is used as the user UUID), a label stanza, and a team. In some embodiments, the user object 310 may also include a role. In some examples, the label stanza may include one or more labels that satisfy the label conditions defined in a workspace object 304, thereby granting the user access to objects within the workspace. In some examples, the user object 310 may include one or more team UUIDs. Each team UUID may identify a different team to which the user, defined by the user object 310, belongs. In some examples, the user object 310 may include one or more role UUIDs. Each role may grant the user specific access and/or privileges to the objects within a workspace. In general, each user of the system may be assigned to a team and assigned a role in order to operate within a workspace. In some examples, a user may not be granted permission to access objects within a workspace if the user has not been assigned a team. In this way, permission to access objects within a workspace is protected by the labels 302 attached to each object including workspace 304, team object 306, role object 308, and user object 310.

A resource provider instance (RPI) object 312 may provide the definitions necessary to instantiate an RPI. An example of an RPI may be resource provider 116$_1$ illustrated in FIGS. 1 and 2. An RPI object 312 may include base object properties (where the object UUID is used as the RPI UUID), RPI properties, and a label stanza. The RPI properties may include reference to a resource provider definition as discussed above, including, for example, the package of data format and interaction methods. In some examples, the label stanza may include one or more labels that satisfy the label conditions defined in a workspace object 304, thereby granting the RPI access to the objects within the workspace. For example, the RPI may have permission to access the objects in a first workspace where the RPI object 312 includes one or more labels that satisfy the label conditions of the associated workspace object 304. Alternatively, the RPI may not have access to the objects in a second workspace where the RPI object 312 does not include labels that satisfy the label conditions of the associated workspace object 304.

A resource object 314 defines the resources that are stored and acted upon inside of a workspace. A resource object 314 includes base object properties (where the object UUID is used as the resource UUID), resource properties, and a label stanza. The resource properties may include data being stored, a log entry, and any/all other object properties available in the system. In some examples, the label stanza may include one or more labels that satisfy the label conditions defined in a workspace object 304, thereby associating the resource with one or more workspaces.

Figure 4A:
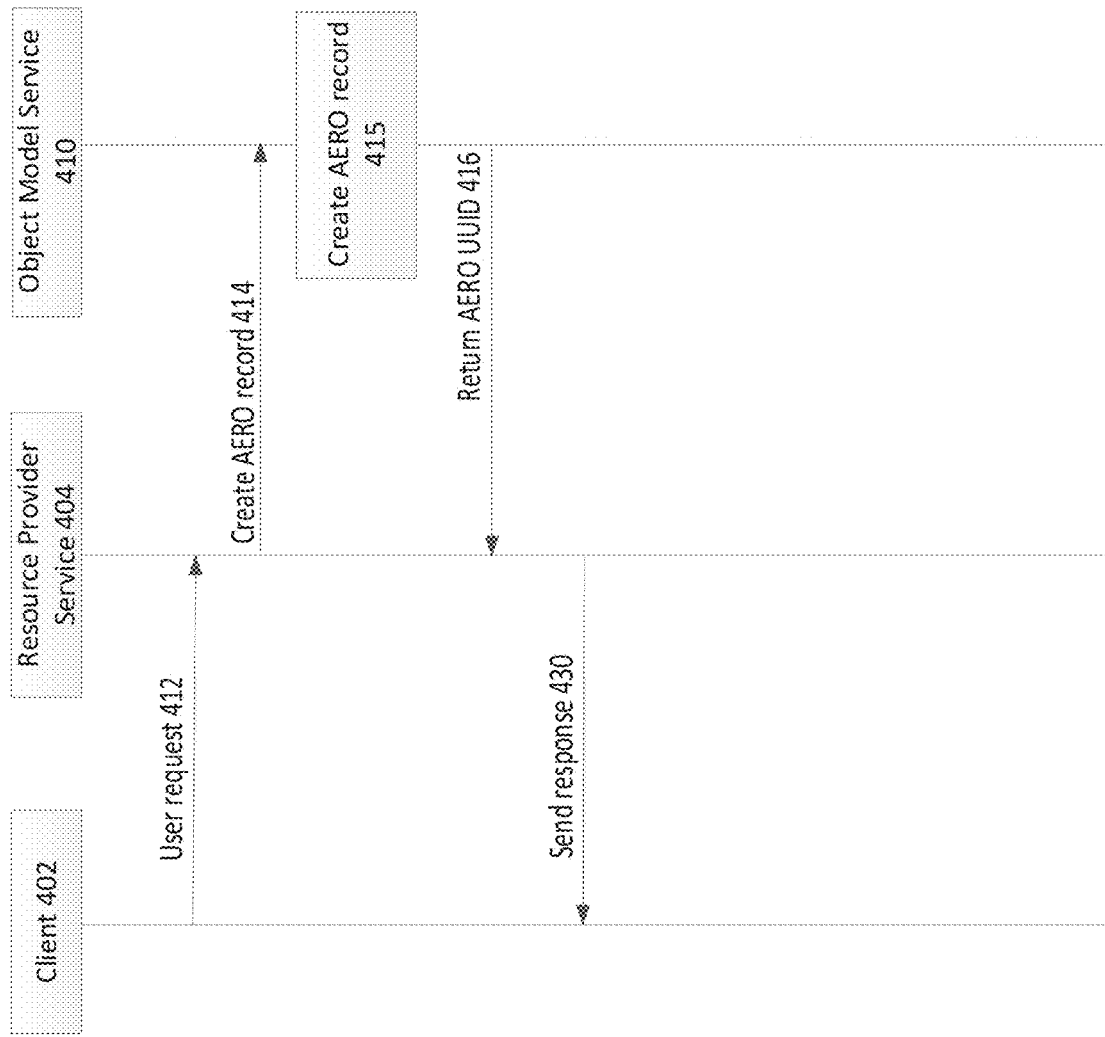
FIG. 4A illustrates an exemplary process flow for creating an AERO record for use by a resource provider architecture according to some embodiments of the present disclosure.
Figure 4B:
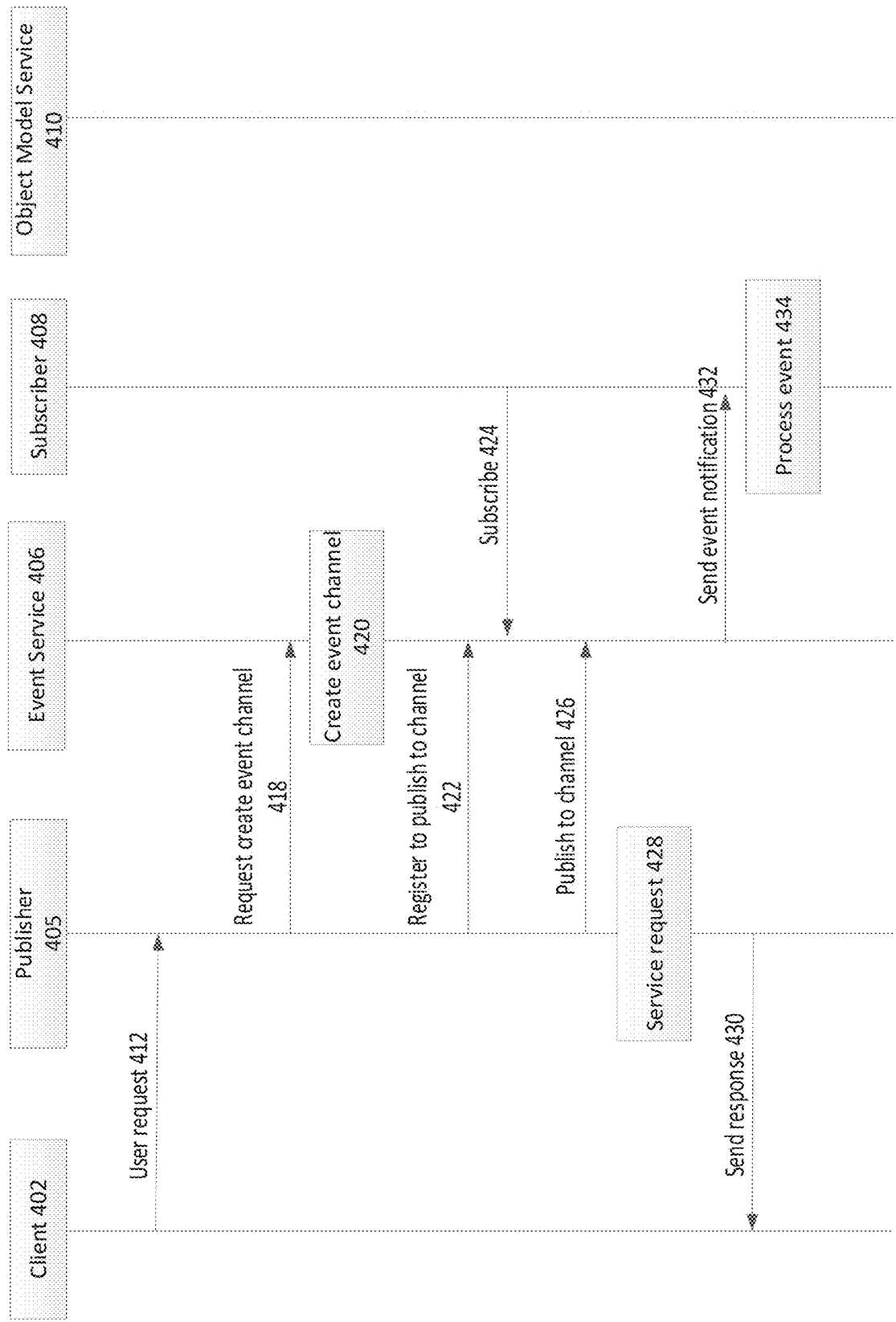
FIG. 4B illustrates an exemplary process flow for publishing events within the extensible data management platform according to some embodiments of the present disclosure.

Turning now to FIGS. 4A and 4B, the exemplary process flows for creating an audit, event, request, and originator (AERO) record and publishing events within an extensible data management platform, respectively, are illustrated according to some embodiments of the present disclosure. In some examples, the extensible data management platform may be the extensible data management platform architecture 100. FIGS. 4A and 4B illustrate the flow between different elements within the extensible data management platform including a client 402, a resource provider service 404, a publisher 405, an event service 406, a subscriber 408, and an object model service (OMS) 410. Client 402 may be an example of the clients, customers, and/or consumers described above with respect to FIGS. 1 and 2. In some examples, client 402 may be a resource provider service 112 or resource provider 116 instance from FIGS. 1 and 2. Resource provider service 404 may be an example of resource provider service 112 within a given namespace 110 in cluster 101 of FIG. 1 that processes client requests. Event service 406 may be an example of a resource provider 116 instance from FIGS. 1 and 2 provisioned to manage events as its resource. Publisher 405 and subscriber 408 may be examples of a resource provider 116 instance from FIGS. 1 and 2 that intend to publish and respond to events, respectively. In some examples, a resource provider service 404 may be a publisher and/or a subscriber. Object model service 410 may be an example of OMS 114 from FIGS. 1 and 2.

According to examples of the present disclosure, one or more resource provider instances, such as resource provider 116 from FIGS. 1 and 2, may interact with each other and with a resource provider service 404. In some examples, the resource provider 116 instance may act as a subscriber. In some examples, the resource provider service 404 may act as a subscriber. In some examples, one or more of the resource provider 116 instances and the resource provider service 404 may be operating as subscribers of events generated by other resource provider 116 instances. Accordingly, process flow 400 is an exemplary flow depicting some of the events and actions that may take place within the extensible data management platform between one or more different resource provider 116 instances. In some examples, the events and actions may occur in a different order than what is illustrated in FIGS. 4A and 4B. In some examples, the events and actions described in FIGS. 4A and 4B may occur asynchronously. In some examples, the events and actions described in FIG. 4 may not occur. The events and actions described with respect to FIGS. 4A and 4B allow for an unpredictable series of events and actions to be chained together through various independent actions taken by the resource provider service and various resource provider instances. Accordingly, the order of events depicted in FIGS. 4A and 4B are used for simplicity of description purposes of the types of events and actions that may occur.

With reference to FIG. 4A, an exemplary process flow for creating an AERO record is illustrated. At action 412, the client 402 sends a user request that is received by the resource provider service 404. As illustrated in FIG. 4A, client 402 is an external client, customer, and/or consumer. In some examples, the fabric namespace 102 from FIGS. 1 and 2 may receive the user request and forward it to the correct resource provider service 404. In some examples, the user request may be received by the resource provider service 404 and forwarded to a resource provider instance, such as resource provider 116 shown in FIGS. 1 and 2. For simplicity, the discussion of FIG. 4A will refer to the user request 412 being received by resource provider service 404 from an external client. The user request may include an API call, such as those described with respect to FIG. 2. In some examples, the user request may include a request to create, update, or delete an object. In some examples, the user request may include a definition to instantiate a resource provider instance. In general, the user request 412 may be any action that client 402 may take within the system.

At action 414, the resource provider service 404 sends a request to create an AERO record to the OMS 410. Creation of an AERO record may be the sole responsibility of the resource provider service 404. That is, a resource provider instance may not be authorized to create an AERO record. Accordingly, the resource provider service 404 may create an AERO record regardless of whether the user request 412 will ultimately be handled by the resource provider service 404 or a resource provider 116 instance.

Each client request 412 may generate a unique AERO record that is associated with that specific request. In some examples, the resource provider service 404 may authenticate the user request before creating the AERO record. In some examples, the resource provider service 404 may create an AERO record to be stored as a stand-alone AERO record object in OMS 410. For example, the client 402 may request that a data object be updated. For such a request, the resource provider service 404 may create a stand-alone AERO record that is associated with the object update request only. In some examples, the resource provider service 404 may create an AERO record to be contained within another object. For example, the client 402 may request to instantiate a resource provider, such as resource provider 116 from FIGS. 1 and 2. For such a request, the resource provider service 404 may create an AERO record as a stanza within the resource provider definition object to be stored in OMS 410.

At action 415, OMS 410 creates, or stores, the AERO record. In some examples, the AERO record is created by resource provider service 404 and is stored by OMS 410. In some examples, the AERO record may be stored as XML, binary, JSON, or another suitable format. In some examples, the AERO record may be added to an existing object, such as for example, a resource provider instance object. In some examples, a new object may be created to store the AERO record. A UUID is generated for a new object containing the AERO record by OMS 410.

At action 416, the OMS 410 returns the AERO object UUID after creating the AERO record object. The UUID of the AERO object may be used to associate work done within the extensible data management platform to the user request 412. The AERO record UUID may be used in future actions to retrieve the AERO record object. In some examples, the AERO record UUID may provide permission to perform work within the extensible data management platform. In some examples, the AERO record UUID may provide permission to perform work, though not directly part of the user request, is done in response to the user request. In some examples, the AERO record UUID may be used to filter visibility of workspace objects, thereby enforcing separation between different workspaces, such as one defined by workspace object 304.

With reference to FIG. 4B, an exemplary process flow for handling events within an extensible data management platform is illustrated. Event management may be used to allow different resource providers, such as resource provider service 404 and resource provider 116 instances, to perform inter-dependent tasks in an asynchronous manner. For simplicity, the discussion below will reference a publisher 405 and subscriber 408. In some examples a resource provider 116 instance may be the publisher and/or subscriber. In some examples, a resource provider service 112 may be the publisher and/or subscriber. Unless stated otherwise, each of the actions illustrated in FIG. 4B may be performed in a different order and/or repeated. The process flow illustrated in FIG. 4B begins with a user request 412, as described above with respect to FIG. 4A. As illustrated in FIG. 4B, the client 402 may be a resource provider service 404 or resource provider 116. In some examples, the client 402 may be an external client, such as a web GUI, in which case the user request 412 may be proxied by the resource provider 404 to the appropriate publisher 405.

At action 418, the publisher 405 sends a request to the event service 406 to create an event channel. For In some examples, the publisher 405 requests creation of the event channel by its own authority. In some examples, the publisher 405 may create the event channel in response to the user request. In some examples, an appropriate event channel already exists, therefore one is not created. In some examples, a resource provider 116 instance sends a create event channel request to event service 406. Due to the asynchronous nature of the extensible data management platform, there are examples where the create event channel request may occur later in the sequence of events. In such examples, other actions, such as those discussed below may occur prior to the request to create an event channel. However, event notifications may not be broadcast until an event channel has been created. In some examples, an error may be returned in response to broadcasting an event to a non-existent channel.

At action 420, the event service 406 creates the event channel. The event channel may be represented by an event channel object stored in OMS 410. In the depicted example, event service 406 manages the creation of event channels. In some examples, there may be one or more resource provider 116 instances acting as event service providers to create and manage event channels. The event channel may notify one or more subscribers within the extensible data management platform, such as for example, resource provider 116 instances, that certain actions have taken place. For example, a resource provider instance may have been instantiated that performs an action every time a user requests the creation of a new resource. In such an example, the resource provider instance may be alerted to a resource creation event by the event service 406, such as described later with respect to action 432. Additionally, the event service 406 may further manage the event channel including listing and deleting the channel.

At action 422, the publisher 405 registers to publish events to the newly created event channel. In some examples, the event service 406 may track the approved publishers in an object stored in OMS 114. The request to register to publish to the event channel may occur asynchronously from the user request and/or work being performed. The publisher 405 may be required to request to publish to an event channel before being able to publish an event to the event channel. That is, the register to publish to channel action 422 may occur at any time after the creation of the event channel but before publishing an event to the event channel. In some examples, a register to publish to channel request may be sent in response to a user request. In some examples, a register to publish to channel request may be sent in response to the publisher 405 completing a task that was initiated by a previous event. In some examples, the event service 406 may prevent publishing events to an event channel until a request to publish is received.

At action 424, subscriber 408 sends a request to subscribe to the event channel. Any resource provider 116 instance and/or resource provider service 112 may subscribe to any event channel within the context of the workspace as defined by the labels stored in the event channel object. That is, the subscriber 408 may subscribe to an event channel that shares the same label as the subscriber 408. In some examples, the subscriber 408 may subscribe to one event channel but not subscribe to another event channel. In some examples, the subscriber 408 may only subscribe to those event channels which pertain to the work performed by the subscriber 408. Subscriptions to event channels may be stored in an object in OMS 114 which allows the event service 406 to know where to send notifications of published events. It is possible that, due to object labels changing over time, a subscriber 408 may not have visibility of an event channel to which it was subscribed because they no longer share the same label.

At action 426, the publisher 405 publishes an event to the event channel. The event may be represented as an object stored in OMS 114. In some examples, a reference to an AERO record may be included in the event to be published. In some examples, information related to an AERO record may be included in the event to be published. The AERO record may provide the context of the event (e.g., workspace and/or labels). Any registered publisher may publish events to an event channel. There may be zero or more registered publishers within the extensible data management platform. In some examples, a resource provider 116 instance may publish an event to the event channel after registering to publish an event. In some examples, one or more resource provider 116 instances may be publishers. Publishing an event to the event channel may occur at any time after the event channel has been created and after the publisher 405 has registered to publish to the event channel. In some examples, an event may be published in response to a user request. In some examples, an event may be published in response to a previous event. In some examples, an event may be published after an action has been performed in response to a previous event. In this way, events may be continually linked such that resource provider 116 instances, i.e., publishers and subscribers, continue to perform work throughout the system without explicit and pre-planned coordination by the resource provider service 404 and/or other resource provider 116 instances. In some examples, the publisher 405 may publish an event to the event channel after every user request. In some examples, the publisher 405 may publish an event to the event channel only after certain types of user requests. For example, the publisher 405 may publish an event for each user request to create a new resource but not publish an event for each read request. In some examples, the event service 406 may check that the event channel is within the context of the AERO record referenced in the published event. The event service 406 may perform this check when an event channel is created, when a subscription occurs, when an event is published, and when event records are read. If the event channel is not within the context the of the referenced AERO record, the published event may be deemed invalid and may be dropped.

At action 428, the publisher 405 services the user request. The present example helps to illustrate the asynchronous nature of the extensible data management platform. In the present example, the publisher 405 services the user request 412 after creating the event channel at action 418, registering to publish to the event channel at action 422, and publishing to the event channel at action 426. In some examples, action 428 may occur before creating an event channel. In some examples, action 428 may occur before registering to publish to the event channel. In some examples, action 428 may occur before publishing to the event channel. In some examples, publisher 405 (e.g., a resource provider service 112) may service the user request after creating the AERO record and receiving the AERO object UUID from the OMS 410. In some examples, a resource provider 116 instance may service the user request after receiving the AERO object UUID from the publisher 405 (e.g., resource provider service 112 or resource provider 116).

In the present example, the publisher 405 may use the AERO record object to perform the work as requested. In some examples, the publisher 405 may only use the AERO record UUID. In some examples, the publisher 405 may request the AERO record object using the AERO record UUID. An AERO record may be required to grant permission before completing any work within the extensible data management platform. In some examples, the publisher 405 may record the work that is to be done prior to doing the work. In some examples, the work to be performed may be performed over an extended period of time. In some examples, the work to be performed may require other work to be performed before completion, such as for example, work done by a different resource provider 116 instance. In such examples, the publisher 405 may subscribe to the appropriate event channel and wait for a specific event notification before continuing with the requested work.

At action 430, the resource provider service 404, or publisher 405, sends a response to the client 402 indicating that the request has been received. In some examples, the response to the client 402 may include the AERO record UUID. In some examples, a resource provider 116 instance receives the request from the client and sends the response to the client. In some examples, the response of action 430 may be sent before the work begins at action 428. In some examples, the user request is completed before the response is sent. In some examples, the resource provider service 404, or the publisher 405, may send the response to the client before the work at action 428 has been completed. In such examples, the response may be an acknowledgement that the work is recorded and will be performed. In some examples, the response may be sent after receiving the AERO record UUID from the OMS 410 and before any other event or task.

At action 432, the event service 406 sends an event notification, which includes a reference to the AERO record, to the subscriber 408. In some examples, the event service 406 may request a list of subscribers from a resource provider service 112. The list of subscribers received from the resource provider service 112 may be filtered to only include subscribers within the context of the AERO record referenced by the event. In some examples, the event notification may be sent to one or more subscribers of the event channel. In some examples, the subscriber 408 may be a resource provider service 404. In some examples, the subscriber may be a resource provider 116 instance. In some examples, the subscriber 408 may request the AERO record object from the OMS 410 after receiving the event notification at action 432. Action 432 may send an event notification to each subscriber of the event channel after an event is published to the event channel at action 426.

At action 434, the subscriber 408 processes the event notification. In some examples, the subscriber 408 may be a resource provider 116 instance. In some examples, the subscriber 408 may be a resource provider 404. The event notification may include an AERO record UUID. In some examples, the subscriber 408 may request the AERO record object referenced by the AERO record UUID. In some examples, the subscriber 408 may include the AERO record UUID in any request, such as for example, a read, write, create, and/or delete request made in the course of processing the event. In some examples, the work performed by subscriber 408 may be a task required for the publisher 405 to complete the user requested task, such as user request 412. In some examples, the work performed by subscriber 408 may be triggered by the user request but not required to be completed to satisfy the user request.

Turning now to FIG. 5, an exemplary object definition 500 of an object including an AERO record stanza according to some embodiments of the present disclosure is illustrated. In the example, basic object property stanza 502 includes the basic object information including an objectUUID, a parent UUID, a createTime, and a modifyTime. The AERO record property stanza 504 includes AERO record specific information including an objectUUID, a createTime, a modifyTime, an originator UUID, the request arguments, the workspace UUID, and audit log information. In some examples, a list of labels may be included in the AERO record property stanza 504. The request and audit information may contain a data in a string format or other known format, such as for example, JSON, YAML, XML, etc.

The basic object property stanza 502, or stanza 502, represents an object that is created by, and stored in, the OMS 114. The object may be created in response to a request to create an object. The object may be any type of object that can be stored in the object model service (OMS) 114. After creation, the modifyTime value may be the only property that may be changed. In some examples, there are more properties than shown.

An AERO record property stanza 504, or stanza 504, may be created for each user request received by the resource provider service 112. In some examples, the AERO record may be stored in OMS 114 as a stanza in a stand-alone object, such as illustrated in FIG. 5. In some examples, the AERO record may be stored as a stanza within another object, such as for example, a resource provider 116 instance object. In such examples, the AERO record stanza may be created when the object is created. When an AERO record is included as a stanza in another object, the AERO record may be considered by the resource provider service 112 as a self-authorizing record granting permission to the entity represented by another stanza of the containing object to perform operations on its own behalf, without a user request.

The objectUUID of stanza 504 may refer to the UUID of the enclosing object. The objectUUID is included in the AERO record stanza as a way to tie the AERO record to the containing object. In some examples, the objectUUID may be used as a reference to the AERO record object itself. For example, a resource provider 116 instance may receive an AERO record UUID and may use the AERO record UUID to grant permission to perform the work being done without having to retrieve the AERO record object from the OMS 114. This may allow the entity performing the work, such as for example, a resource provider 116 instance, to work within the context provided by the AERO record without having to retrieve and/or understand the context of the AERO record. In some examples, the objectUUID may be used by a signing service that records cryptographic signatures of stanza to verify each stanza.

The createTime field of the AERO record property stanza 504 may be used to store a timestamp of the time at which the AERO record was created. The modifyTime field of the AERO record property stanza 504 may be used to store a timestamp of the last modification of the AERO record. The values in the createTime and modifyTime fields may be owned, or updated, by the resource provider service 112 that created it. In some examples, the timestamps are stored according to ISO 8601. In some examples, the timestamp may be stored in the UTC time zone. In some examples, the timestamp may be stored in the time zone of the extensible data management platform. The createTime value and modifyTime values may be used to determine whether an AERO record has expired. For example, an AERO record may have a specified lifetime, or lease. In some examples, the lifetime, or lease, may be 5 minutes. In some examples the lifetime may be longer or shorter than 5 minutes. When the difference between the current time value and modifyTime value is less than the specified lifetime, or lease time, the AERO record is still active (i.e. has not expired). By causing an update to the modifyTime value, the lease is renewed. In all examples, the createTime value and modifyTime values may be used to verify whether the AERO record is actively being used within the extensible data management platform.

In some examples, the createTime value may be the timestamp of the creation of a stand-alone AERO record object created in response to a specific user request. In some examples, the createTime value may be a time stamp of the creation of an AERO record as a stanza within another object, such as for example, a resource provider instance object. In some examples, the createTime of the AERO record (e.g., stanza 504) is stored independently of a createTime of the containing object (e.g., stanza 502). For example, an object may be created and include an AERO record stanza. The created object, stanza 502, may have a createTime value that is unique from the createTime value of the AERO record stanza 504. A separate AERO record createTime value may be stored because the AERO record may not be able to rely on the creation time of the containing object.

The modifyTime field may be used to store the timestamp of the last access and/or update of the AERO record. In some examples, the modifyTime value may be updated so that the AERO record does not expire because work is being performed (e.g., the "lease" to perform additional work is renewed). In some examples, an audit log may be written to the AERO record and the modifyTime value may be updated to reflect the change to the AERO record. In some examples, the modifyTime of an AERO record that is included in another object may be different than the modifyTime of the containing object.

The originator field of stanza 504 refers to the entity that that caused the AERO record to be created. In some examples, the originator may be a user UUID. In some examples, the originator may be the UUID of the user 310 described above in FIG. 3. In some examples, the originator may be a team, a workspace, a URL, etc. The originator UUID may be used for auditing purposes. In some examples, the AERO records may be written to a log as they are used. A review of the log may indicate not only what work was performed but also which resource providers performed the work and which users requested the work to be performed and when the work was performed.

The label field, when included in the AERO record stanza, may be a list of labels. In some examples, the list may be a list of UUIDs of the label 302 discussed above in FIG. 3. Each label UUID in the list may aid with filtering which resource provider 116 instances have visibility of the given AERO record and associated work request. For example, resource provider 116 instance may request an object from the OMS 114 and the resource provider 116 service may use the label UUIDs in the AERO record to filter the returned information to only provide objects within the context and of the label. In this way, the AERO record provides the context to the resource provider instance for the work to be performed because the resource provider instance only has visibility of objects and information allowed by the AERO record.

The workspace field may be a workspace UUID. In some examples, the workspace may be the UUID of the workspace 304 discussed above in FIG. 3. In some examples, the workspace UUID may provide a broader context for than the label UUID, allowing greater visibility to more objects and information.

The request field may include arguments of the original user request for which the AERO record was created. As mentioned above, the request arguments may be stored as a string, JSON, YAML, XML, or another format. For example, the request may include storage request information (such as size, speed, type, etc.) for creating a new volume. In some examples, the request field may be empty. For example, the AERO record may be included as a reference within another object and have no arguments stored. In some examples, when the AERO record is written to a log the request information is also written to the log. In this way, a review of the log may provide detailed request information to aid in audits.

The audit field may include audit log information. The audit log information may be stored as a string, JSON, YAML, XML, or another format. In some examples, the audit log information may be a record of all actions performed using the AERO record for context and/or permission. In some examples, the audit log information may be left blank. Resource providers may write to the audit log as part of performing work. The audit log of the AERO record may be separate and distinct from the log of a resource provider.

Figure 6:
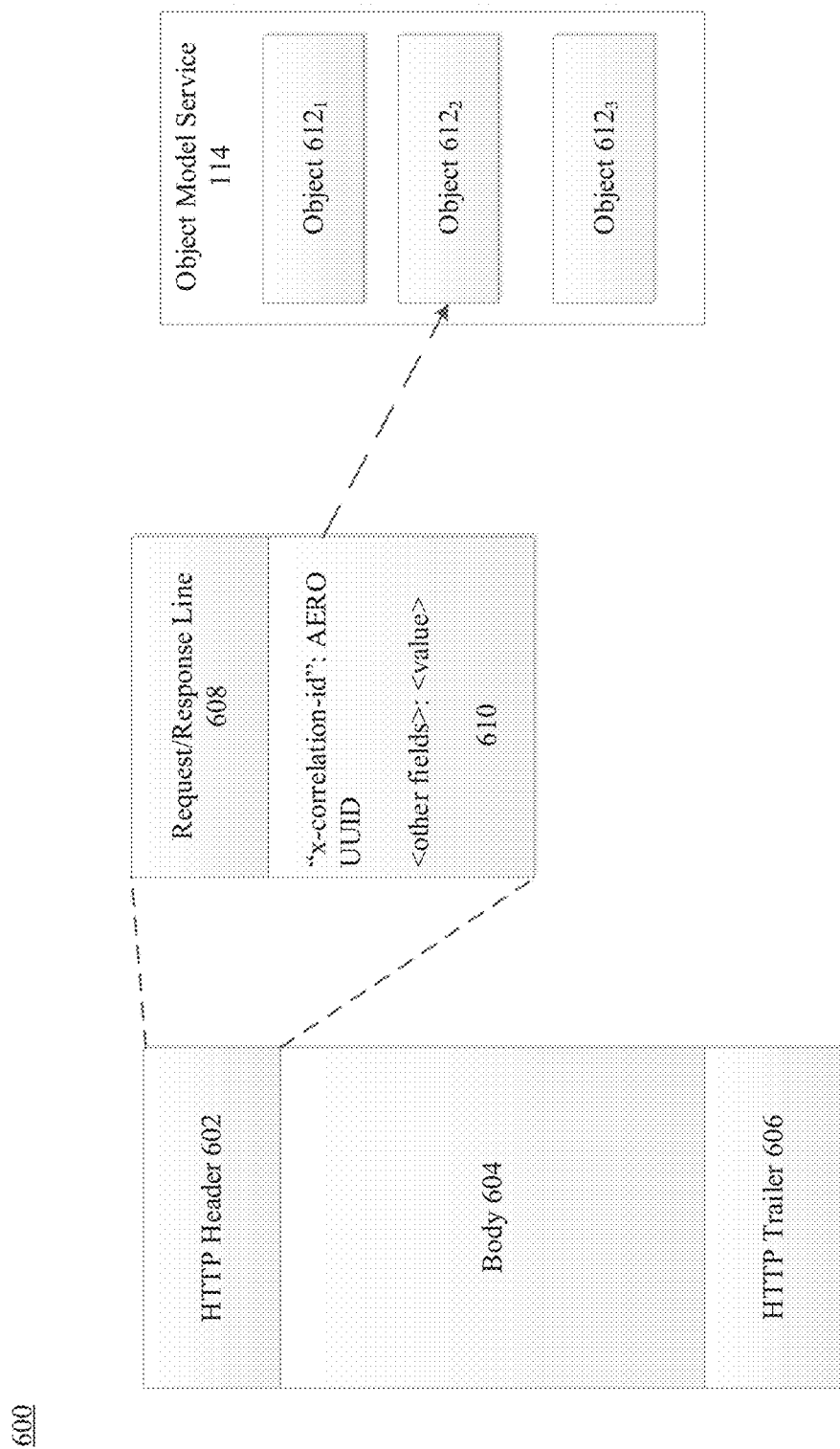
FIG. 6 illustrates an exemplary HTTP header for providing an AERO record for use by a resource provider architecture according to some embodiments of the present disclosure.

Turning now to FIG. 6, an exemplary HTTP header for providing an AERO record for use by a resource provider 116 instance according to some embodiments of the present disclosure is illustrated. FIG. 6 illustrates an exemplary HTTP request and the relationship to the AERO record object stored in the object model service (OMS) 114. API calls to the extensible data management platform architecture 100 may be made through HTTP requests and the responses through HTTP responses. Generally, HTTP servers are stateless and require additional information, such as a cookie, to maintain state information. A cookie may be included in each HTTP request and response to allow a client and server to maintain state. There is no client information stored between HTTP requests. This makes each request separate and unconnected. By including an AERO record UUID in the HTTP header of a REST API call, the extensible data management platform is able to maintain state information between calls with minimal overhead while providing a large benefit.

A HTTP request may include a HTTP header 602, a body 604, and a HTTP trailer 606. The HTTP header 602 may include a request/response line 608 and header fields 610. The request/response line 608 may include the version of the HTTP protocol being used by the request. The request/response line 608 specifies the HTTP method being used, such as, for example, GET, POST, PUT, and DELETE. The HTTP method used may define the type of API call being performed. For example, a GET request may be used to retrieve information. A POST request may be used to store new information. A PUT request may be used to update information. A DELETE request may be used to delete information. However, each method may be defined differently by different systems, making REST API systems flexible. Additionally, there may be other fields included in the request/response line such as a status code and a status message.

The header fields 610 provide information about the HTTP request. For example, some common header fields include the date, the server type, the host type, the language, content type, and content length. An additional header field "x-correlation-id" may be included with a HTTP request. The x-correlation-id may contain for its value an AERO record UUID that corresponds to an AERO record object in the OMS 114. The AERO record UUID may be used to correlate the current HTTP request, or API call, with a previous HTTP request/response, or API call/response. In this way, the system may be able to perform the requested task and/or provide the requested status because the AERO record UUID may provide the required authentication and/or context required to provide the information. In this way, the AERO record aids the extensible data management platform in overcoming a limitation of the REST API calls.

As shown in FIG. 6, for example, the AERO record UUID provided in the HTTP header fields 610 may correlate to an existing AERO record object $612_2$ stored in OMS 114. In some examples, the received AERO record UUID may be validated against the AERO record object 612 in OMS 114 prior to performing the work. In some examples, the AERO record object 612 may be retrieved from OMS 114 to have further access to the context and user information.

Figure 7:
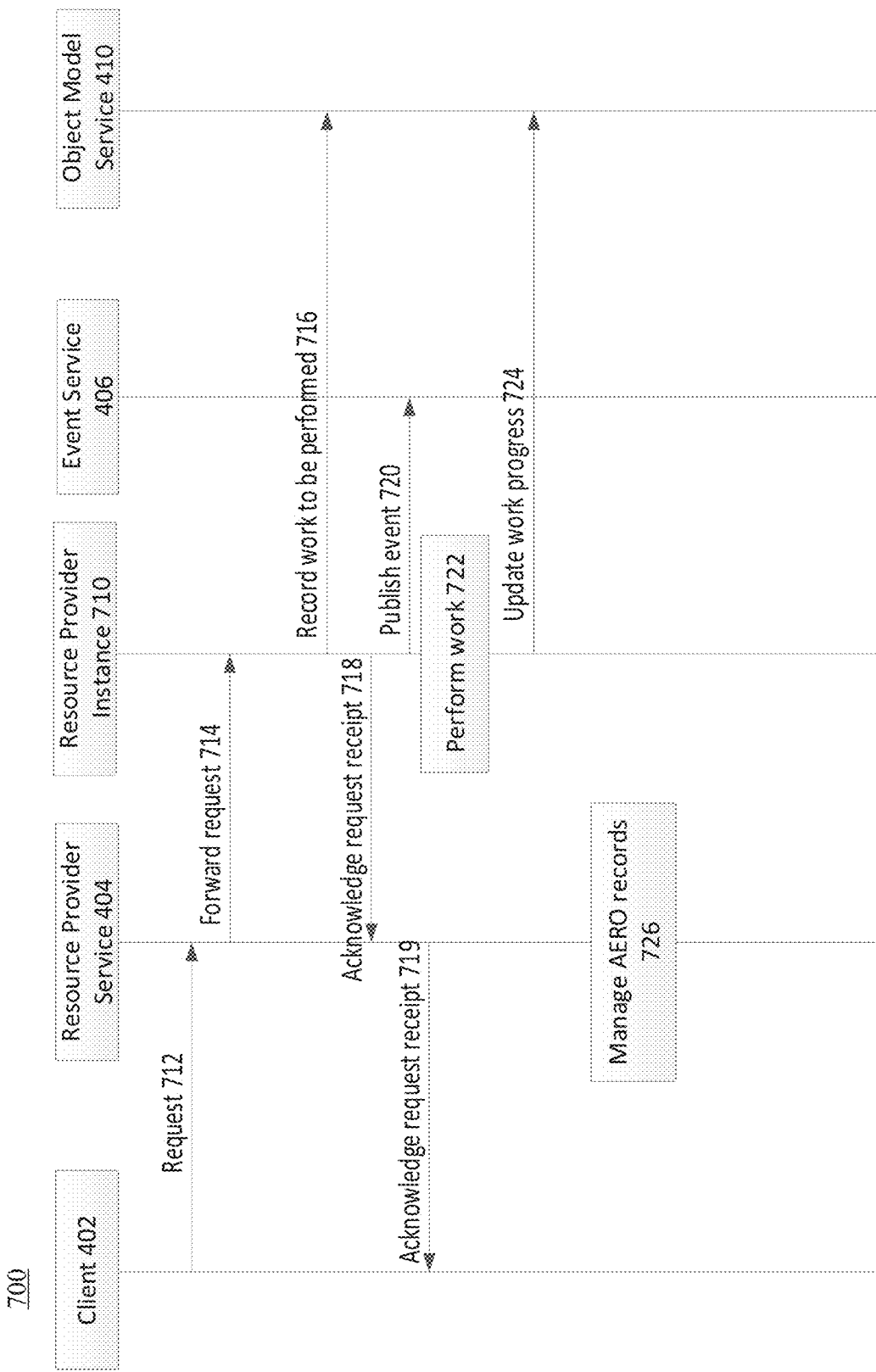
FIG. 7 illustrates an exemplary process flow for an AERO record based on a user request according to some embodiments of the present disclosure.

Turning now to FIG. 7, an exemplary process flow of an AERO record moving through the extensible data management platform according to some embodiments of the present disclosure is illustrated. FIG. 7 illustrates a process flow 700 between different elements within the extensible data management platform including client 402, a resource provider service 404, a resource provider instance 710, an event service 406, and an object model service (OMS) 410. Client 402 may be an example of the clients, customers, and/or consumers described above with respect to FIGS. 1 and 2. Resource provider service 404 be an example of the resource provider service 112 described above with respect to FIGS. 1 and 2. Resource provider instance 710 may be an example of resource provider 116 instance within a given namespace 110 in cluster 101 of FIG. 1 that processes client requests. Event service 406 may be an example of another resource provider 116 instance from FIGS. 1 and 2. OMS 410 may be an example of object model service 114 from FIGS. 1 and 2. In some examples, communication shown may be HTTP messages such as those described above with respect to FIG. 6.

At action 712, the client 402 sends a request to the resource provider service 404. The request may be received by a fabric namespace and forwarded to resource provider service 404. As discussed above with respect to FIGS. 1 and 2, the fabric namespace may implement a fabric API service to authenticate and direct client requests. The request may be directed by the fabric namespace to the target namespace of the request. In some examples, the request may be a read/write request. For example, a request to instantiate a resource provider 116 instance may be a write request. In some examples, the request may be a create request. In some examples, the request may be a delete request.

At action 714, the resource provider service 404 forwards the request to the resource provider instance 710 The resource provider service 404 may receive the forwarded request and determine what actions to take. In some examples, including the illustrated example, the client request may be an API call that is handled by the resource provider instance 710. In some examples, the client request may be an API call handled by a resource provider service 112. The resource provider service 404 may create an AERO record, as described with respect to FIG. 4A, before forwarding the client request 712. The resource provider service 404 may include a reference to the AERO record in the HTTP header of the message forwarded to the resource provider instance 710. In some examples, a reference to the AERO record may be included in the HTTP header of the message forwarded to other system components, such as the event service 406 or other resource provider 116 instances.

At action 716, the resource provider instance 710 may record the work to be performed in OMS 410. A new object may be created in OMS 410 to store the work to be performed. Due to the asynchronous nature of the extensible data management platform, actions may occur between the time that a request is received and the time at which the work is performed. In some examples, where the request is handled by a resource provider 116 instance, the resource provider 116 instance may send a request for the resource provider service 404 to store the work to be performed in OMS 410. Recording the work to be done maintains a record of all work yet to be performed. In this way, a resource provider 116 instance may be allowed to process other requests and/or event notifications before completing the work for the present request.

At action 718, the resource provider instance 710 responds to the client 402 with an acknowledgment that the request was received and that the work will be performed. In the illustrated example, the acknowledgement is sent to the resource provider service 404 which forwards the acknowledgement to the client as action 719. The resource provider service 404 may send acknowledge request 719 may be forwarded to the fabric namespace before being forwarded to the client 402. The asynchronous nature of the extensible data management platform may allow for the request to be acknowledged before the work has been performed. In some examples, the response acknowledging the request may include the AERO record UUID. In some examples, the response acknowledging the request may include an object UUID associated with the request. In this way, the client may be able to track the progress of the request. For example, when the work to be performed is complex and requires a longer period of time to complete, the client may be able to request progress updates by polling the object UUID. Each subsequent request for status may generate a new AERO record for tracking the request. In some examples, such as when the work to be performed is simple, the acknowledgement may be sent after performing the work.

At action 720, the resource provider instance 710 publishes an event to the event service 406. As discussed above with respect to FIG. 4B, an event channel may need to be created and a request to publish to the event channel sent prior to publishing an event. A reference to the AERO record may be included in the published event. Event service 406 provides a means of asynchronous communication among the resource provider 116 instances and resource provider service 404 within a namespace through the use of events and event notifications. In some examples, the event may be published in response to an event notification being received. In some examples, the event may be published in response to work being performed. For example, a new object created event may be published after each time that a new object is created. In some examples, an event may be published by a resource provider 116 instance that is performing the work instead of the resource provider service 404. In some examples, other resource provider 116 instances or the resource provider service 404 may perform additional work in response to the event published and an event notification received. In such examples, the AERO record UUID included with the event notification may provide context for filtering the recipients of the event notification and permission for the recipients to perform the work. In some examples, an event may not be published to event service 406.

At action 722, the resource provider instance 710 performs the requested work. As illustrated, the work is performed after acknowledging the request to perform work at action 718. In some examples, the work may be performed before acknowledging the client request. In some examples, a resource provider 116 instance may perform the work if the request was an API call intended to be handled by the resource provider 116 instance. In some examples, the work may be performed in response to an event notification. In some examples, the work may be performed as one continuous work flow. In some examples, the work may be performed as multiple discrete work flows over a period of time.

At action 724, the resource provider instance 710 may update the progress of work. The work progress may be stored in the original work object stored in the OMS 410. In some examples, the AERO record object associated with the work may be updated. In some examples, the modifyTime value of the AERO record may be updated, thereby renewing the lease of the AERO record. In some examples, the basic object modifyTime property is updated by the OMS 410 when the AERO record modifyTime is updated. In this way, the AERO record does not expire. In some examples, an entry may be written to the audit log of the AERO record.

According to some examples of the present disclosure, actions 722 and 724 may be repeated one or more times until the work is completed. That is, a portion of the work may be performed followed by updating the progress of the work. More of the work may then be performed followed, again, by updating the progress of the work. An entry may be written to the audit log of the AERO record with each progress update. The work progress may be updated without performing any work in order to renew the lease of the AERO record, indicating that work still needs to be done. In this way, the extensible data management platform provides flexibility for performing the requested work. In some examples, work may be done on one or more resource provider 116 instances in response to events that have been sent and received. Throughout this process, the AERO record may be updated to keep the AERO record alive (i.e. not expired) and valid for future use.

At action 726, the resource provider service 404 performs AERO record management tasks. AERO record management tasks include maintaining a pool, or list, of active AERO records. Active AERO records may include AERO records that have an active lease. The list of active AERO records may allow the resource provider service 404 track the progress of current tasks and keep users informed of the progress. In some examples, the resource provider service 404 may maintain a pool, or list, of known expired AERO records. The resource provider service 404 may deny, or kill, requests that reference known expired AERO records. In this way, the expired AERO records may be retrieved for future review for audit purposes. Expiring AERO records may reduce the resources used by the resource provider service 404 to track the AERO records and therefore improve performance of the resource provider service 404.

In some examples, the resource provider service 404 checks the basic object modifyTime property to determine whether the AERO record lease is active. In some examples, the resource provider service 404 checks the modifyTime of the AERO stanza to determine whether the lease is still active. A lease may be considered active if the preferred modifyTime is within a pre-determined period of time. In some examples, the time period may be five minutes. In some examples, the period may be ten minutes. In some examples, the time period may be longer or shorter.

In an example, a user requests the creation of a volume with given volume creation parameters, such as size, type, etc. The request is received by the resource provider service 404 and an AERO record is created for the volume creation request. The resource provider service 404 forwards the request, including the new AERO record UUID, to the appropriate resource provider 116 instance which then creates the new volume according to the requested specifications and publishes a volume created event, including the AERO record UUID, to the appropriate event channel. The event service 406 notifies subscribers of the new event, filtering out subscribers that are in a different context than that indicated by the AERO record based on the workspace and/or label information indicated by the AERO record. In some examples, this is accomplished by the event service 406 requesting a list of subscribers from the resource provider service 404 that are within the context of the AERO record. From the list of subscribers, a first subscriber, a resource provider 116 instance, receives an event notification including the AERO record UUID. The AERO record UUID grants the resource provider 116 instance permission to update a table of volumes to include the new volume. A second subscriber, another resource provider 116 instance, receives the event notification, including the AERO record UUID. The AERO record UUID grants the resource provider 116 instance permission to creates a snapshot schedule for the new volume.

Figure 8:
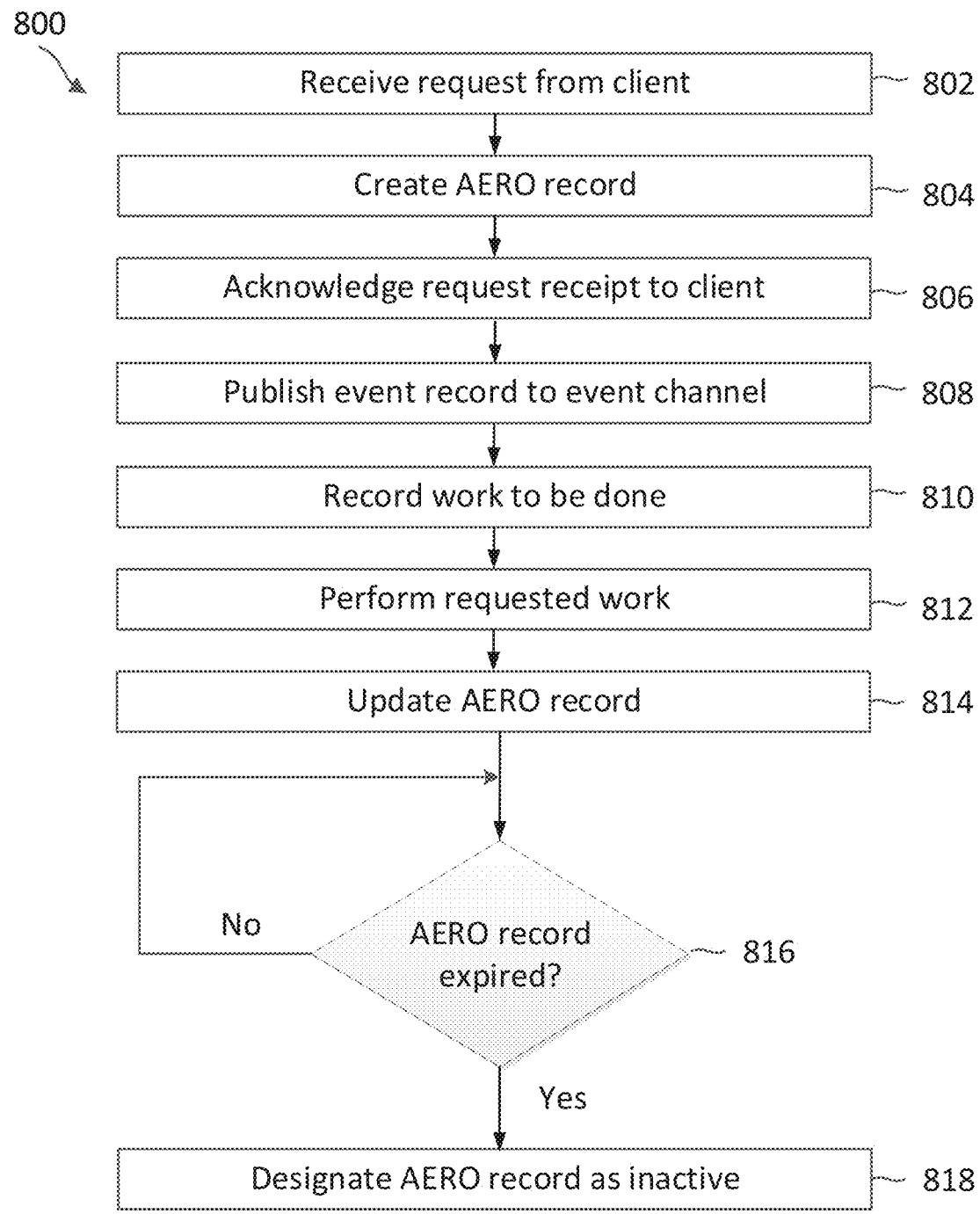
FIG. 8 illustrates an exemplary method for managing a lifecycle of an AERO record according to some embodiments of the present disclosure.

Turning to FIG. 8, an exemplary method for managing the lifecycle of an AERO record according to some embodiments of the present disclosure. In an example, the method 800 may be implemented by an exemplary cluster 101. In particular, the method 800 may be implemented by a resource provider service 112 within a namespace 110 of cluster 101. In some examples, portions of method 800 may be implemented by a resource provider 116 instance. It is understood that additional steps can be provided before, during, and after the steps of method 800, and that some of the steps described can be replaced or eliminated for other embodiments of the method 800. It is further understood that the following steps may be completed in a different order than shown and/or repeated. Because of the asynchronous nature of the extensible data management platform, the order illustrated in FIG. 8 is one exemplary order.

At block 802, the resource provider service receives a request from a client. In some examples, the request may be directed to the resource provider service. In some examples, the request may be received by a fabric namespace before being directed to the appropriate namespace and the appropriate resource provider service. In some examples, the resource provider service may forward the request to the appropriate resource provider instance.

At block 804, the resource provider service may create an AERO record. In some examples, the resource provider service may create a new AERO record associated with the client request. When creating a new AERO record, a new object, the AERO object, may be created by the resource provider service and stored in an object model service, such as OMS 114. The new AERO record may be assigned a unique UUID. The unique AERO record UUID may distinguish this AERO record from the other AERO records and identify the AERO record as corresponding to the user request. The AERO record may provide the necessary permission and context required to perform the work required by the client request.

At block 806, the resource provider service responds to the client and acknowledges receipt of the request. In some examples, the acknowledgement may be sent after work has been performed. In some examples, the acknowledgement may be sent while work is being performed. In some examples, the response may include an AERO record UUID corresponding to the request.

At block 808, the resource provider service publishes an event to the appropriate event channel. In some examples, the event channel may need to be created before publishing the event. In such examples, the resource provider service requests creation of the event channel and requests permission to publish to the event channel. In some examples, the event channel may already exist and the resource provider instance may already have permission to publish events to the channel. In some examples, a resource provider instance publishes an event to the appropriate event channel.

At block 810, the resource provider service records the work to be done. In some examples, a resource provider instance may record the work to be done once the resource provider service has forwarded a request to that resource provider instance. In some examples, the resource provider instance to which the request is directed may record the work to be done. The record of the work to be done may be stored in the object model service. In some examples, the AERO record object may be updated. In some examples, the modifyTime of the AERO stanza object may be updated by the resource provider service. Whenever the AERO stanza is updated, the basic object property stanza will have its modifyTime updated by the OMS.

At block 812, the resource provider service performs the requested work. In some examples, a resource provider instance may perform the requested work. In some examples, the work may be performed before sending an acknowledgement of the request to the user. In some examples, the work may be performed as one contiguous piece of work. In some examples, the work to be done may be broken into smaller discrete pieces of work to be performed over time with breaks in between each piece of work.

At block 814, the resource provider service updates the AERO record 814. In some examples, the AERO record is updated after block 810 and before block 812. In some examples, the AERO record update includes audit information. In some examples, the audit information provides details of what work has been performed. In some examples, the AERO record modifyTime is updated. In some examples, the AERO record is updated after each portion of the requested work is completed. That is, method 800 may loop between blocks 812 and 814 until the requested work is completed.

At decision block 816, the resource provider service determines whether the AERO record has expired. The resource provider service may compare the current time value to the modifyTime value of the AERO record or of the modifyTime property of the basic object property stanza. If the difference between the two values is below a time threshold, the AERO record is determined to be alive. Otherwise, the AERO record is determined to be expired. If it is determined that the AERO record has not expired (i.e., is alive), the method 800 may return to decision 816. In some examples, method 800 may return to block 812 to continue performing the work requested.

If, instead, it is determined that the AERO record has expired, the method 800 proceeds to block 818.

At block 818, the resource provider service designates the AERO record as inactive. In some examples, designating the AERO record as inactive, or expired, includes removing the AERO record from a pool of active AERO records. In some examples, the AERO record is archived.

Figure 9:
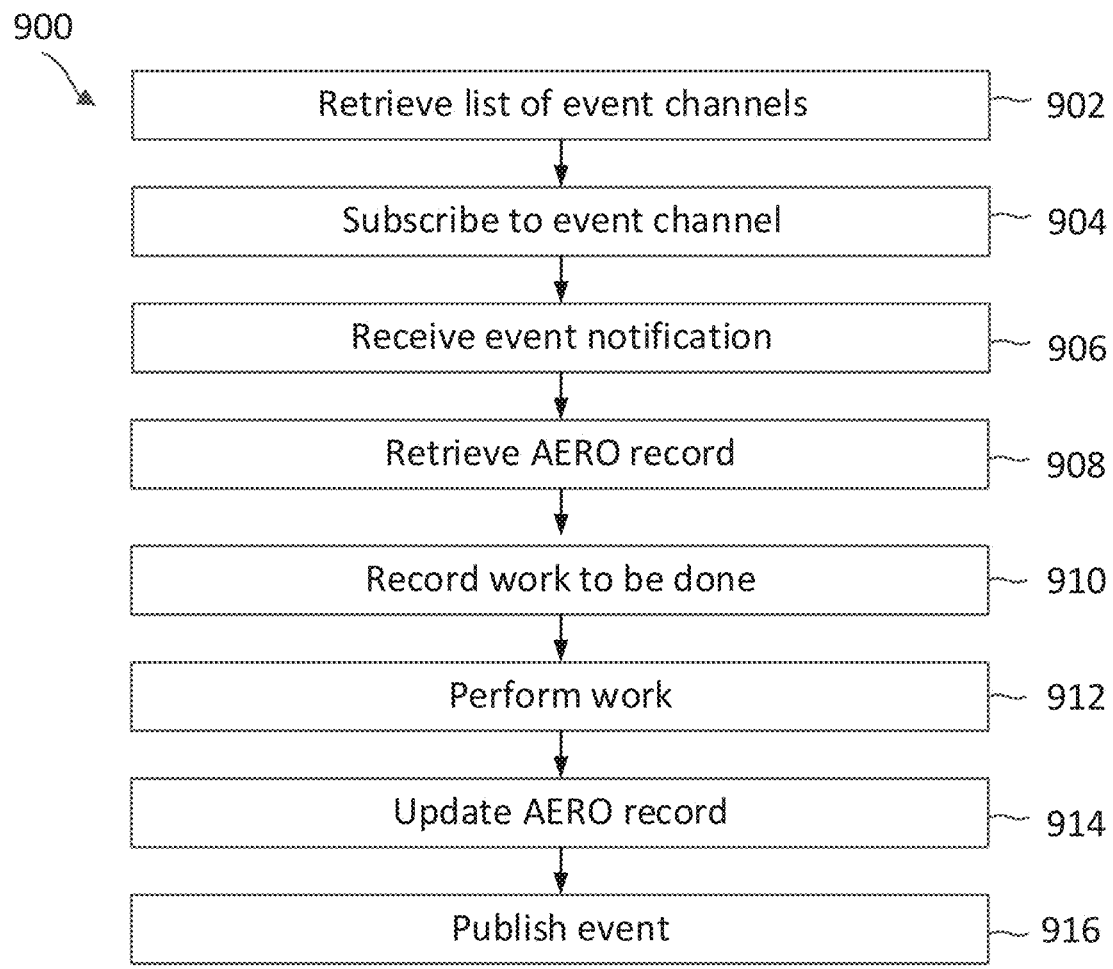
FIG. 9 illustrates an exemplary method for performing work using an AERO record according to some embodiments of the present disclosure.

Turning to FIG. 9, an exemplary method for performing work using an AERO record according to some embodiments of the present disclosure is illustrated. In an example, the method 900 may be implemented by an exemplary cluster 101. In particular, the method 900 may be implemented by a resource provider service 112 in a namespace 110 of cluster 101. In some examples, method 900 may be implemented by a resource provider 116 instance. It is understood that additional steps can be provided before, during, and after the steps of method 900, and that some of the steps described can be replaced or eliminated or duplicated for other embodiments of the method 900. For the sake of simplicity, the terms subscriber and publisher will be used below. In some examples, the subscriber and/or publisher may be a resource provider instance. In some examples, the subscriber and/or publisher may be the resource provider service.

At block 902, the subscriber retrieves a list of available event channels. In some examples, the subscriber requests a list of available event channels from the resource provider service. In some examples, the subscriber maintains a list of available event channels. The list of available event channels may be filtered from a larger list of all event channels based on the labels of the subscriber. For example, if a self-referenced AERO record is used then the list of event channels will be filtered based on the labels of the subscriber. As another example, if the AERO record is associated with a specific user request then only the event channels available within the workspace will be returned.

At block 904, the subscriber subscribes to an event channel. As discussed above, with reference to FIG. 4, the event channel must exist before a subscriber can subscribe to the event channel. In some examples, the subscriber previously created the event channel. In some examples, a resource provider service previously created the event channel. In some examples, a different resource provider instance previously created the event channel. In other words, the subscriber may only subscribe to an already existing event channel. For example, an event channel may be created to notify subscribers of the creation of a storage volume. Any resource provider instance may process work based on the creation of a storage volume by subscribing to that event channel.

At block 906, the subscriber receives an event notification including a reference to an AERO record. In some examples, the reference to the AERO record may be the AERO record UUID. In some examples, the subscriber may receive information relating to the AERO record. The subscriber may receive only those events that are visible to the subscriber based on the label(s) of the subscriber and the label(s) of the AERO record and the label(s) on the object representing the event channel. The event notifications may be filtered based on workspace and/or labels. In some examples, the filtering may be based on the label and workspace within the AERO record of the subscriber. In some examples, the event notification may include pertinent information about the operation that triggered the event. For example, a storage volume created event notification may include, in addition to the AERO record UUID, information such as the volume name, the volume capacity, the volume protocol, etc. The details received in the event notification may allow the subscriber to perform a task in response to the event notification.

At block 908, the subscriber may optionally retrieve the AERO record object. In some examples, the subscriber may retrieve the AERO record object from the OMS using the AERO record UUID provided in the event notification. In some examples, the subscriber may require more information about the context of the event notification received in order to perform an operation. The subscriber may retrieve the AERO record object using the reference to the AERO record provided in the event notification. In some examples, the subscriber submits an object read request to the resource provider service to retrieve the AERO record from the OMS.

At block 910, the subscriber records the work to be done. In some examples, the work to be done is recorded in the OMS. In some examples, this may include adding to the audit log of the AERO record provided in the event notification. In some examples, this may include creating a new object to be used for performing the work to be done.

At block 912, the subscriber performs the work. In an example, the subscriber may create a volume snapshot schedule in response to receiving a new volume created event notification. The request to create the volume snapshot schedule object may include the AERO record received with the event notification. In some examples, the resource provider service may honor the request while the AERO record is still alive (i.e., not expired).

At block 914, the subscriber updates the AERO record received with the event notification. In some examples, the subscriber may write additional information to the audit log of the AERO record. In some examples, the subscriber may update the modifyTime of the AERO record. In some examples, the work to be performed at block 912 may be a long-running process. In such examples, the subscriber may update the AERO record periodically as the work is being performed. Updating the AERO record while the work is being performed may ensure that the AERO record does not expire before the work is completed. In some implementations, writing to the AERO record may be limited to the resource provider service that created the AERO record.

At block 916, the subscriber may publish an event to an event channel. As discussed previously, must register with the event channel to become a publisher. In some examples, the event may be published to the same event channel from which the event notification was received. In some examples, the event may be published to a different event channel than that from which the original event notification was received. For example, the subscriber may publish an event indicating the creation of a volume snapshot schedule for the new volume. The event published may then trigger a new event notification to be sent to a different resource provider instance that will process the new event notification according to method 900 as described above.

Figure 10:
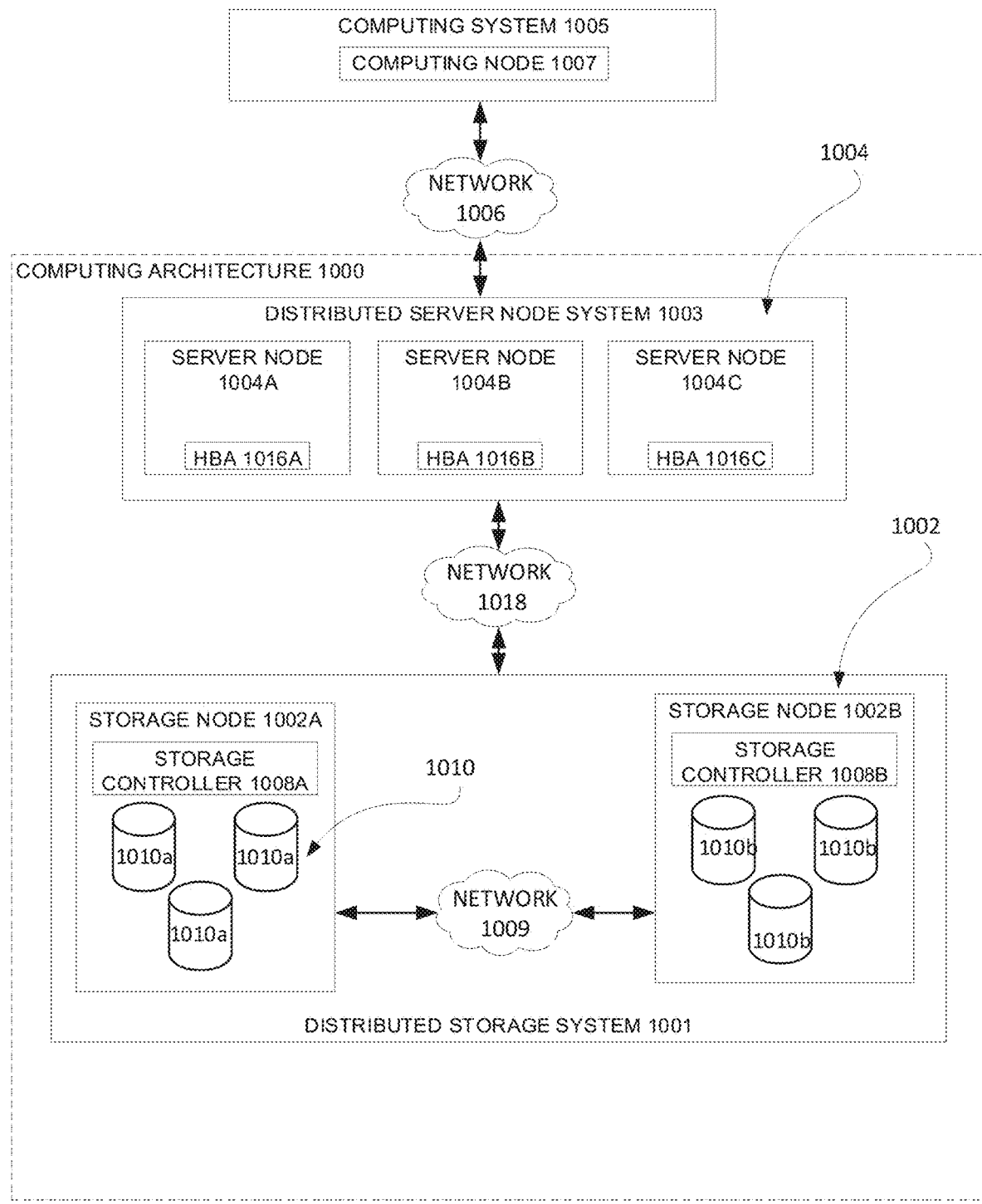
FIG. 10 is an illustration of an exemplary computing architecture according to some embodiments of the present description.

FIG. 10 is an illustration of a computing architecture 1000 in accordance with one or more example embodiments. The computing architecture 1000 is an example of one manner in which one or more of the computing architectures described herein may be implemented. The computing architecture 1000, which, in some cases includes a distributed storage system 1001 comprising a number of storage nodes 1002 (e.g., storage node 1002*a*, storage node 1002*b*) in communication with a distributed server node system 1003 comprising a number of server nodes 1004 (e.g., server node 1004*a*, server node 1004*b*, server node 1004*c*). The distributed storage system 1001 and the distributed server node system 1003 are examples in which containers and controllers of the above figures may be implemented, for example.

A computing system 1005 communicates with the computing architecture 1000, and in particular, the distributed server node system 1003, via a network 1006. The network 1006 may include any number of wired communications links, wireless communications links, optical communications links, or combination thereof. In one or more examples, the network 1006 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 1005 may include, for example, at least one computing node 1007. The computing node 1007 may be implemented using hardware, software, firmware, or a combination thereof In one or more other examples, the computing node 1007 is a client (or client service) and the computing system 1005 that the client runs on is, for example, a physical server, a workstation, etc.

The storage nodes 1002 may be coupled via a network 1009, which may include any number of wired communications links, wireless communications links, optical communications links, or a combination thereof. For example, the network 1009 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 1009 may use a transmission control protocol/Internet protocol (TCP/IP), a remote direct memory access (RDMA) protocol (e.g., Infiniband®, RDMA over Converged Ethernet (RoCE) protocol (e.g., RoCEv1, RoCEv2), iWARP), and/or another type of protocol. Network 1009 may be local or remote with respect to a rack or datacenter. Additionally, or in the alternative, the network 1009 may extend between sites in a WAN configuration or be a virtual network extending throughout a cloud. Thus, the storage nodes 1002 may be as physically close or widely dispersed as needed depending on the application of use. In some examples, the storage nodes 1002 are housed in the same racks. In other examples, the storage nodes 1002 are located in different facilities at different sites around the world. The distribution and arrangement of the storage nodes 1002 may be determined based on cost, fault tolerance, network infrastructure, geography of the server nodes 1004, another consideration, or a combination thereof.

The distributed storage system 1001 processes data transactions on behalf of other computing systems such as, for example, the one or more server nodes 1004. The distributed storage system 1001 may receive data transactions from one or more of the server nodes 1004 and take an action such as reading, writing, or otherwise accessing the requested data. These data transactions may include server node read requests to read data from the distributed storage system 1001 and/or server node write requests to write data to the distributed storage system 1001. For example, in response to a request from one of the server nodes 1004*a*, 1004*b*, or 1004*c*, one or more of the storage nodes 1002 of the distributed storage system 1001 may return requested data, a status indictor, some other type of requested information, or a combination thereof, to the requesting server node. While two storage nodes 1002*a* and 1002*b* and three server nodes 1004*a*, 1004*b*, and 1004*c* are shown in FIG. 10, it is understood that any number of server nodes 1004 may be in communication with any number of storage nodes 1002. A request received from a server node, such as one of the server nodes 1004*a*, 1004*b*, or 1004*c* may originate from, for example, the computing node 1007 (e.g., a client service implemented within the computing node 1007) or may be generated in response to a request received from the computing node 1007 (e.g., a client service implemented within the computing node 1007).

While each of the server nodes 1004 and each of the storage nodes 1002 is referred to as a singular entity, a server node (e.g., server node 1004*a*, server node 1004*b*, or server node 1004*c*) or a storage node (e.g., storage node 1002*a*, or storage node 1002*b*) may be implemented on any number of computing devices ranging from a single computing system to a cluster of computing systems in communication with each other. In one or more examples, one or more of the server nodes 1004 may be run on a single computing system, which includes at least one processor such as a microcontroller or a central processing unit (CPU) operable to perform various computing instructions that are stored in at least one memory. In one or more examples, at least one of the server nodes 1004 and at least one of the storage nodes 1002 reads and executes computer readable code to perform the methods described further herein. The instructions may, when executed by one or more processors, cause the one or more processors to perform various operations described herein in connection with examples of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

A processor may be, for example, a microprocessor, a microprocessor core, a microcontroller, an application-specific integrated circuit (ASIC), a field programmable gate array (FPGA), etc. The computing system may also include a memory device such as random access memory (RAM); a non-transitory computer-readable storage medium such as a magnetic hard disk drive (HDD), a solid-state drive (SSD), other persistent memory such as storage class memory (SCM), and/or an optical memory (e.g., CD-ROM, DVD, BD); a video controller such as a graphics processing unit (GPU); at least one network interface such as an Ethernet interface, a wireless interface (e.g., IEEE 802.11 or other suitable standard), a SAN interface such as implemented by a Fibre Channel interface (e.g., host bus adapter(s)), an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 1002 contains any number of storage devices 1010 for storing data and can respond to data transactions by the one or more server nodes 1004 so that the storage devices 1010 appear to be directly connected (i.e., local) to the server nodes 1004. For example, the storage node 1002a may include one or more storage devices 1010a and the storage node 1002b may include one or more storage devices 1010b. In various examples, the storage devices 1010 include HDDs, SSDs, and/or any other suitable volatile or non-volatile data storage medium. In some examples, the storage devices 1010 are relatively homogeneous (e.g., having the same manufacturer, model, configuration, or a combination thereof). However, in other example, one or both of the storage node 1002a and the storage node 1002b may alternatively include a heterogeneous set of storage devices 1010a or a heterogeneous set of storage device 1010b, respectively, that includes storage devices of different media types from different manufacturers with notably different performance.

The storage devices 1010 in each of the storage nodes 1002 are in communication with one or more storage controllers 1008. In one or more examples, the storage devices 1010a of the storage node 1002a are in communication with the storage controller 1008a, while the storage devices 1010b of the storage node 1002b are in communication with the storage controller 1008b. While a single storage controller (e.g., 1008a, 1008b) is shown inside each of the storage node 1002a and 1002b, respectively, it is understood that one or more storage controllers may be present within each of the storage nodes 1002a and 1002b.

The storage controllers 1008 exercise low-level control over the storage devices 1010 in order to perform data transactions on behalf of the server nodes 1004, and in so doing, may group the storage devices 1010 for speed and/or redundancy using a protocol such as RAID (Redundant Array of Independent/Inexpensive Disks). The grouping protocol may also provide virtualization of the grouped storage devices 1010. At a high level, virtualization includes mapping physical addresses of the storage devices 1010 into a virtual address space and presenting the virtual address space to the server nodes 1004, other storage nodes 1002, and other requestors. Accordingly, each of the storage nodes 1002 may represent a group of storage devices as a volume. A requestor can therefore access data within a volume without concern for how it is distributed among the underlying storage devices 1010.

The distributed storage system 1001 may group the storage devices 1010 for speed and/or redundancy using a virtualization technique such as RAID or disk pooling (that may utilize a RAID level). The storage controllers 1008a and 1008b are illustrative only; more or fewer may be used in various examples. In some cases, the distributed storage system 1001 may also be communicatively coupled to a user display for displaying diagnostic information, application output, and/or other suitable data.

With respect to the distributed server node system 1003, each of the one or more server nodes 1004 includes any computing resource that is operable to communicate with the distributed storage system 1001, such as by providing server node read requests and server node write requests to the distributed storage system 1001. In one or more examples, each of the server nodes 1004 is a physical server, while in other examples each of the server nodes 1004 may be virtual machines. In one or more examples, each of the server nodes 1004 includes one or more host bus adapters (HBA) 1016 in communication with the distributed storage system 1001. The HBA 1016 may provide, for example, an interface for communicating with the storage controllers 1008 of the distributed storage system 1001, and in that regard, may conform to any suitable hardware and/or software protocol. In various examples, the HBAs 1016 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 1016 of the server nodes 1004 may be coupled to the distributed storage system 1001 by a network 1018 comprising any number of wired communications links, wireless communications links, optical communications links, or combination thereof. For example, the network 1018 may include a direct connection (e.g., a single wire or other point-to-point connection), a networked connection, or any combination thereof. Examples of suitable network architectures for the network 1018 include a LAN, an Ethernet subnet, a PCI or PCIe subnet, a switched PCIe subnet, a WAN, a MAN, the Internet, Fibre Channel, or the like. In many examples, a server node 1004 may have multiple communications links with a single distributed storage system 1001 for redundancy. The multiple links may be provided by a single HBA 1016 or multiple HBAs 1016 within the server nodes 1004. In some examples, the multiple links operate in parallel to increase bandwidth.

In one or more examples, each of the server nodes 1004 may have another HBA that is used for communication with the computing system 1005 over the network 1006. In other examples, each of the server nodes 1004 may have some other type of adapter or interface for communication with the computing system 1005 over the network 1006.

To interact with (e.g., write, read, modify, etc.) remote data, a HBA 1016 sends one or more data transactions to the distributed storage system 1001. Data transactions are requests to write, read, or otherwise access data stored within a volume in the distributed storage system 1001, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 1001 executes the data transactions on behalf of the server nodes 1004 by writing, reading, or otherwise accessing data on the relevant storage devices 1010. A distributed storage system 1001 may also execute data transactions based on applications running on the distributed server node system 1003. For some data transactions, the distributed storage system 1001 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 1001 to the distributed server node system 1003, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein.

Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving, by a resource provider service, a request from a client, wherein the resource provider service is in a namespace residing in a cluster of computing nodes implemented by one or more processors;
creating, by the resource provider service, a record in response to the request from the client, wherein the record includes information about the request, a system context for the request, and permission to perform work based on the request;
responding, by the resource provider service, to the client acknowledging the request;
forwarding, by the resource provider service, the request to a first resource provider in the namespace residing in the cluster of computing nodes implemented by the one or more processors;
performing, by the first resource provider, a first task based on the request;
sending, by the first resource provider, information related to the record to a second resource provider in the namespace residing in the cluster of computing nodes implemented by the one or more processors, thereby granting permission to the second resource provider to perform a second task based on the request; and
updating, by the resource provider service, the record after performing the first task.

2. The method of claim 1, further comprising:
storing, by the resource provider service, in the record a reference to an originator of the request from the client.

3. The method of claim 1, further comprising:
deleting, by the resource provider service, the record in response to a determination that the record has expired and is no longer required for audit purposes.

4. The method of claim 1, further comprising:
archiving, by the resource provider service, the record in response to a determination that the record has expired.

5. The method of claim 1, further comprising:
writing, by the resource provider service, the record to a log to aid in auditing of a system.

6. The method of claim 1, further comprising:
filtering, by the resource provider service, visibility of a resource based on the record.

7. The method of claim 1, further comprising:
providing, by the resource provider service, an indication of progress of the task to be completed, wherein the indication of progress includes a reference to the record.

8. A computing device comprising:
a memory containing machine readable medium comprising machine executable code having stored thereon instructions for performing a method of managing a lifecycle of a record by a resource provider service;
a processor coupled to the memory, the processor configured to execute the machine executable code to cause the processor to:
receive, by a resource provider service, a request from a client, wherein the resource provider service is in a namespace implemented by the processor;
create, by the resource provider service, a record in response to the request from the client, wherein the record corresponds to information about the request from the client;
record, by the resource provider service, a task to be done in response to the request from the client;
perform, by the resource provider, the task after recording the task;
respond, by the resource provider service, to the client acknowledging the request;
send, by the resource provider, information related to the record to a second resource provider in the namespace, thereby granting permission to the second resource provider to perform a second task based on the request;
update, by the resource provider service, the record in response to performing the task; and
determine, by the resource provider service, that the record has expired.

9. The computing device of claim 8, wherein the processor is further configured to:
publish, by the resource provider service, the record as a resource provider definition object in an object model service, the resource provider definition object having a label field to define a workspace in which the resource definition object is permitted to operate.

10. The computing device of claim 8, wherein the processor is further configured to:
store, by the resource provider service, in the record a reference to an originator of the request from the client.

11. The computing device of claim 8, wherein the processor is further configured to:
write, by the resource provider service, the record to a log to aid in auditing of a system.

12. The computing device of claim 8, wherein the processor is further configured to:
delete, by the resource provider service, the record in response to the determination that the record has expired and is no longer needed for audit purposes.

13. The computing device of claim 8, wherein the processor is further configured to:
filter, by the resource provider service, visibility of a resource based on the record.

14. The computing device of claim 8, wherein the processor is further configured to:
provide, by the resource provider service, an indication of progress of the task to be completed, wherein the indication of progress includes a reference to the record.

15. A non-transitory machine readable medium having stored thereon instructions for performing a method of managing a lifecycle of a record by a resource provider service that is in a namespace, comprising machine executable code which when executed by at least one machine, causes the machine to:
create, by the resource provider service, a record in response to a request from a client, wherein the record corresponds to information about the request from the client, and wherein the record provides a context for system data usable for filtering the system data for use by a first resource provider instance that is in the namespace;
respond, by the resource provider service, to the client acknowledging the request;
record, by the resource provider service, a task to be done in response to the request from the client;

perform, by the first resource provider instance, the task after recording the task;

send, by the first resource provide instance, information related to the record to a second resource provider instance in the namespace; and determine, by the resource provider service, that the record has expired.

16. The non-transitory machine readable medium of claim 15, further comprising machine executable code that causes the machine to:

delete, by the resource provider service, the record in response to the determination that the record has expired and is no longer required for audit purposes.

17. The non-transitory machine readable medium of claim 15, further comprising machine executable code that causes the machine to:

archive, by the resource provider service, the record in response to the determination that the record has expired.

18. The non-transitory machine readable medium of claim 15, further comprising machine executable code that causes the machine to:

store, by the resource provider service, in the record a reference to an originator of the request from the client.

19. The non-transitory machine readable medium of claim 15, further comprising machine executable code that causes the machine to:

filter, by the resource provider service, visibility of a resource based on the record.

20. The non-transitory machine readable medium of claim 15, further comprising machine executable code that causes the machine to:

update, by the resource provider service, the record in response to performing the task.

* * * * *